US011952275B1

(12) United States Patent
Scenna et al.

(10) Patent No.: US 11,952,275 B1
(45) Date of Patent: Apr. 9, 2024

(54) METHODS AND SYSTEMS FOR DISTRIBUTED REFORMING OF HYDROCARBON FUELS FOR ENHANCED HYDROGEN PRODUCTION

(71) Applicant: United States Government, as represented by the Secretary of the Army, Aberdeen Proving Ground, MD (US)

(72) Inventors: Richard Scenna, Baltimore, MD (US); Ashwani Gupta, College Park, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 591 days.

(21) Appl. No.: 16/006,483

(22) Filed: Jun. 12, 2018

Related U.S. Application Data

(60) Provisional application No. 62/518,854, filed on Jun. 13, 2017.

(51) Int. Cl.
*C01B 3/36* (2006.01)
(52) U.S. Cl.
CPC ........ *C01B 3/36* (2013.01); *C01B 2203/0216* (2013.01); *C01B 2203/0255* (2013.01); *C01B 2203/1247* (2013.01); *C01B 2203/1614* (2013.01); *C01B 2203/169* (2013.01)

(58) Field of Classification Search
CPC ...................................................... C01B 3/36
USPC ...................................................... 252/373
See application file for complete search history.

(56) References Cited

U.S. PATENT DOCUMENTS

| | | | | |
|---|---|---|---|---|
| 2003/0233788 A1* | 12/2003 | Lewis | .................. | C10J 3/00 431/142 |
| 2009/0212259 A1* | 8/2009 | Noguchi | ............... | B01J 8/0095 252/373 |
| 2014/0065501 A1* | 3/2014 | Pham | .................... | C10G 45/02 429/425 |
| 2014/0135534 A1* | 5/2014 | Bischoff | ................. | B01D 1/14 568/451 |
| 2018/0326393 A1* | 11/2018 | Andreoli | ................ | B01J 19/002 |

FOREIGN PATENT DOCUMENTS

WO WO2017080909 * 5/2017

OTHER PUBLICATIONS

Dubois, Oxygen-Enriched Fuel Reforming of Heavy Liquid Hydrocarbon Fuels for Fuel Cells, dissertation, 2011, Washington, DC, USA.

(Continued)

*Primary Examiner* — Douglas B Call
(74) *Attorney, Agent, or Firm* — Kirsten Hiera

(57) ABSTRACT

A method for controlling a fuel reformation reaction in a fuel reformation reactor is provided. Furthermore, a non-transitory computer-readable storage medium is provided, which is configured to store a program for controlling a fuel reformation reaction in a fuel reformation reactor. In addition, a fuel reformation system for controlling a fuel reformation reaction is provided, which includes a fuel reformation reactor and a control unit.

10 Claims, 22 Drawing Sheets

(56) References Cited

OTHER PUBLICATIONS

Liu, Consalvi, and Fuentes, Effects of Water Vapor Addition to the Air Stream on Soot Formation and Flame Properties in a Laminar Coflow Ethylene/Air Diffusion Flame, Combustion and Flame, Jan. 11, 2014, pp. 1724-1734, vol. 161, Elsevier, Inc., USA.

Prufert, Hunger, and Hasse, The Analysis of Chemical Time Scales in a Partial Oxidation Flame, Combustion and Flame, Sep. 25, 2013, pp. 416-426, vol. 161, Elsevier, Inc., USA.

Rahimi, Amiri, and Shabanian, Experimental Study on Using HiTAC Technique for Synthesis Gas Production, Chemical Engineering Communications, Mar. 15, 2013, pp. 907-918, vol. 200, Taylor & Francis, USA.

Scenna and Gupta, Preheats Effects on JP8 Reforming Under Volume Distributed Reaction Conditions, Journal of Energy Resources Technology, May 2016, pp. 032202-1 to 032202-6, vol. 138, Asme, USA.

Scenna and Gupta, Partial Oxidation of JP8 in a Distributed Reactor, Fuel Processing Technology, Jun. 2015, pp. 205-213, vol. 134, Elsevier, Inc., USA.

Scenna and Gupta, Partial Oxidation of JP8 in a Well-Insulated Distributed Reactor, Fuel Processing Technology, Oct. 22, 2015, pp. 174-181, vol. 142, Elsevier, Inc., USA.

Scenna and Gupta, Dry and Wet Partial Oxidation in a Distributed Reactor, International Journal of Hydrogen Energy, 2017, pp. 4102-4110, vol. 42, Issue 7, Elsevier, Inc., the Netherlands.

Gupta, Developments in High Temperature Air Combustion (Flameless Oxidation) and Fuel Reforming, 44th AIAA Aerospace Sciences Meeting and Exhibit, Jan. 9-12, 2006, pp. 1-11, the American Institute of Aeronautics and Astronautics, Inc., USA.

Tsuji, Gupta, Hasegawa, Katsuki, Kishimoto, Morita, High Temperature Air Combustion: From Energy Conservation to Pollution Reduction, 2003, pp. 85-86, CRC Press LLC, USA.

Scenna and Gupta, Preheats Effect on Distributed Reaction Fuel Reforming, Proceedings of the ASME 2015 Power and Energy Conversion Conference, Jun. 28-Jul. 2, 2015, ASME, San Diego, CA.

Tang, Huang, He, Jin, Wang, Miao, Effects of N2 Dilution on Laminar Burning Characteristics of Propane—Air Premixed Flames, Energy & Fuels, Nov. 14, 2008, pp. 151-156, vol. 23, American Chemical Society, USA.

Ricou and Spalding, Measurements of Entrainment by Axisymmetrical Turbulent Jets, Journal of Fluid Mechanics, Aug. 1961, pp. 21-32, vol. 11, Cambridge Core, UK.

Scenna and Gupta, Effect of Oxygen Concentration on Distributed Flame Regime, Proceedings of the ASME 2017 Power and Energy Conversion Conference, Jun. 26-30, 2017, Charlotte, NC.

Scenna and Gupta, Influence of Distributed Reaction Regime on Fuel Reforming, Proceedings of the ASME 2017 International Design Engineering Technical Conferences & Computers and Information in Engineering Conference, Aug. 6-9, 2017, Cleveland, OH.

Scenna, Dubois, and Gupta, Effect of Oxygen Content at Various Steam to Carbon Ratios in a Distributed Reactor, Proceedings of 47th Power Conference 2016, Jun. 13-16, 2016, Orlando, FL.

Albrecht, Reactor Modeling and Process Analysis for Partial Oxidation of Natural Gas, dissertation, Oct. 15, 2004, Enschede, the Netherlands.

Gupta, Thermal Characteristics of Gaseous Fuel Flames Using High Temperature Air, Journal of Engineering for Gas Turbines and Power, Jan. 2004, pp. 9-19, vol. 126, Asme, USA.

Lipman, An Overview of Hydrogen Production and Storage Systems with Renewable Hydrogen Case Studies, Clean Energy States Alliance Report, May 2011, pp. 1-32, Clean Energy States Alliance, VT, USA.

Scenna, Non-Catalytic Thermal Reforming of JP-8 in a Distributed Reactor, dissertation, 2017, MD, USA.

\* cited by examiner

METHODS AND SYSTEMS FOR DISTRIBUTED REFORMING OF HYDROCARBON FUELS FOR ENHANCED HYDROGEN PRODUCTION

GOVERNMENT INTEREST

The invention described herein may be manufactured, used, imported, sold, and licensed by or for the Government of the United States of America without the payment of any royalty thereon or therefor.

FIELD OF THE INVENTION

The present disclosure relates generally to methods and systems for improved reforming of hydrocarbon fuels. More specifically, the invention relates to methods and systems for non-catalytic partial oxidation of hydrocarbon fuels under distributed reaction regime conditions.

BACKGROUND OF THE INVENTION

Reforming is chemical decomposition of hydrocarbon materials (fuels) into a hydrogen and carbon monoxide rich gas, known as syngas. Typically, catalytic reforming efficiency is in the range of 75-90%. For stationary applications, natural gas is typically utilized due to its low cost and ease of reformation. Sulfur compounds present in natural gas are easily removed with an Amine/Claus process, which is suitable for stationary power applications. However, in mobile power applications, natural gas is not as convenient as middle distillate fuels. Kerosene-based fuels are more convenient in commercial sectors, while Jet Propellant 8 (JP8) fuel is more suitable in most defense applications due to its convenience and logistics restrictions. JP8 has a higher hydrogen density, as compared to a high-pressure methane (at 3600 psi) or liquid hydrogen (at 20K, 1 atm).

Reforming of middle distillate fuels has been a particular challenge for mobile power applications. High sulfur content in JP8 (up to 3000 ppm) present challenges as catalysts used in reforming (platinum, rhodium, and nickel) are quickly rendered inert when exposed to sulfur. In addition, the high carbon content of middle distillate fuels (such as JP8) can also result in coke and soot formation, which blocks the active catalyst sites. Conventional catalytic reformation methods focus on developing catalysts that suppress the formation of coke or carbon formation. Alternatively, operating conditions can be altered to reduce soot formation. This requires operating at higher oxygen to carbon ratio than ideal conditions (O/C=1.0), in order to reduce the reforming efficiency. An alternative approach is to employ a non-catalytic reforming process, which negates issues arising from sulfur content and provides significant cost reduction. However, conventional non-catalytic reformation reactors have issues with incomplete conversion and significant soot formation of up to 40%. These conventional non-catalytic reformation methods have a lower reforming efficiency ranging from 60% to 70%.

For the foregoing reasons, there is a need in the art for non-catalytic methods and systems for improved reformation of hydrocarbon.

SUMMARY OF THE INVENTION

The present disclosure resolves the aforementioned problems with non-catalytic methods and systems for reformation of hydrocarbon fuels. According to an exemplary embodiment of the present disclosure, a method is provided for controlling a fuel reformation reaction in a fuel reformation reactor, which includes controlling an amount of a fuel injected into a fuel reformation reactor; controlling an amount of steam that is injected into the fuel reformation reactor; controlling an amount of oxygen that is injected into the fuel reformation reactor; and controlling the temperature of the fuel reformation reactor. In one aspect of this embodiment, the method further includes controlling the mixture rates of reactants in the reformation reactor.

In one embodiment, a non-transitory computer-readable storage medium configured to store a program for controlling a fuel reformation reaction in a fuel reformation reactor is provided. The program includes instructions for controlling an amount of a fuel injected into a fuel reformation reactor; controlling an amount of steam that is injected into the fuel reformation reactor; controlling an amount of oxygen that is injected into the fuel reformation reactor; and controlling the temperature of the fuel reformation reactor. In one aspect of this embodiment, the program also includes controlling the mixture rates of reactants in the reformation reactor.

Another embodiment of the present disclosure is a fuel reformation system for controlling a fuel reformation reaction. The system includes a fuel reformation reactor and a control unit configured to control an amount of a fuel injected into a fuel reformation reactor; control an amount of steam that is injected into the fuel reformation reactor; control an amount of oxygen that is injected into the fuel reformation reactor; and control the temperature of the fuel reformation reactor. In one aspect of this embodiment, the control unit may also include controlling the mixture rates of reactants in the reformation reactor.

BRIEF DESCRIPTION OF THE DRAWINGS

The accompanying drawings, which are included to provide further understanding of the present disclosure, and are incorporated in and constitute a part of the specification, illustrate exemplary embodiments of the present disclosure, and together with the description serve to explain the principles of the present disclosure. The present disclosure will now be described further with reference to the accompanying drawings as follows.

DETAILED DESCRIPTION

Figure 1:
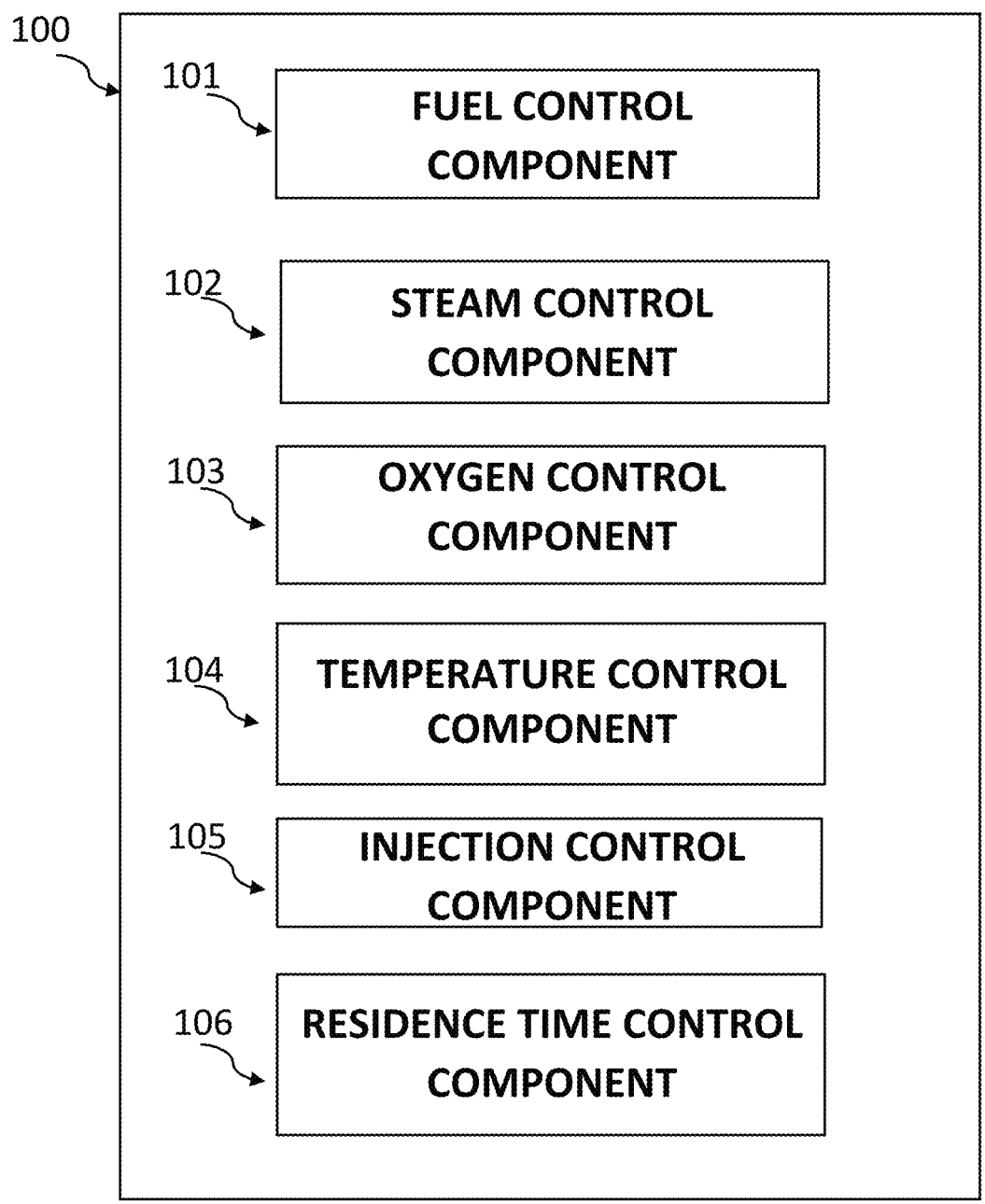
FIG. 1 is a diagram of an exemplary control unit for a reformation system according to the present disclosure.
Figure 2:
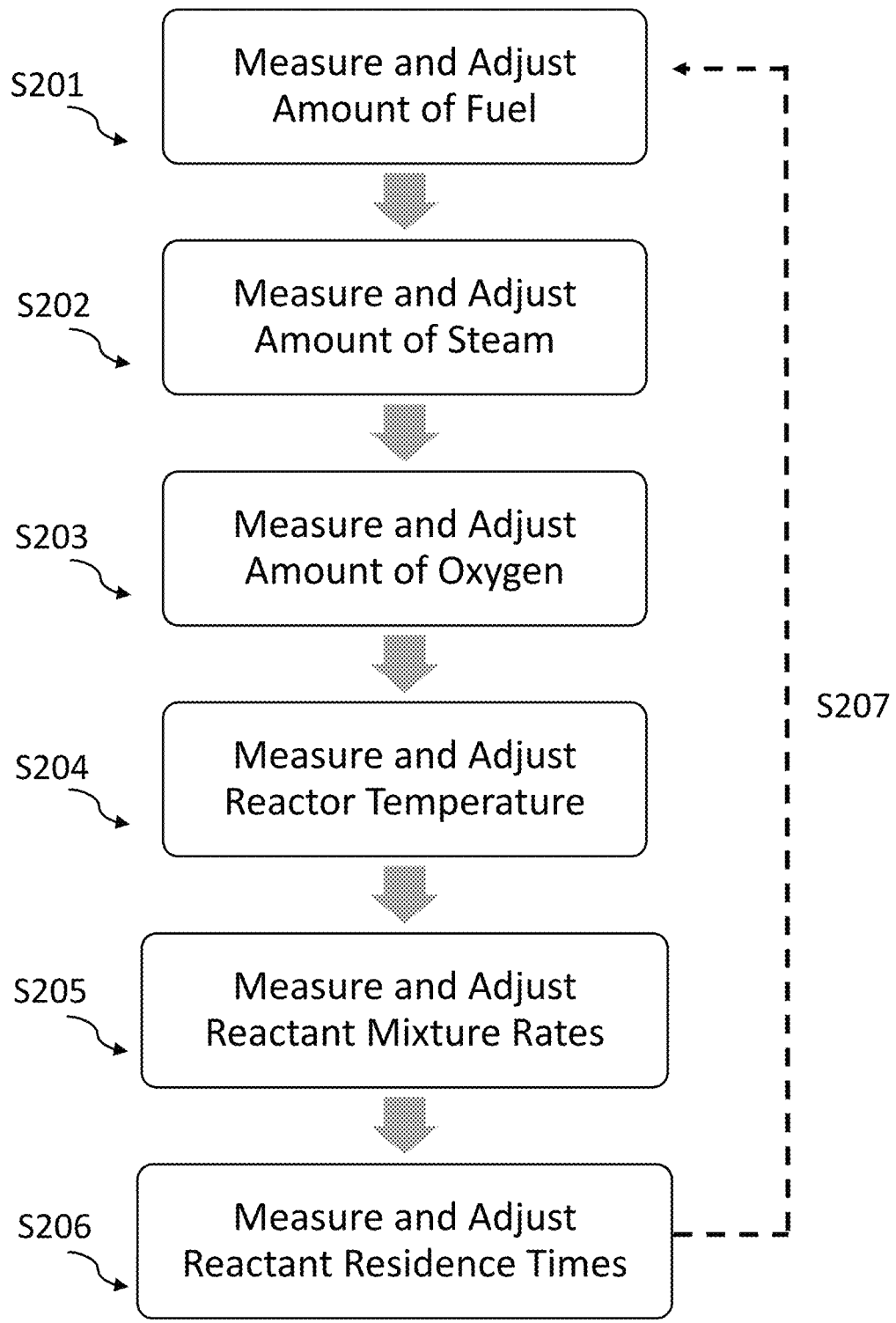
FIG. 2 is a diagram of an exemplary control method according to the present disclosure.

FIGS. 1 and 2 show an exemplary control unit and control method (according to the present disclosure) for the reformation of high molecular weight hydrocarbon fuels, respectively. The control unit and control method of the present disclosure facilitate effective reformation of high molecular weight hydrocarbon fuels. Suitable high molecular weight hydrocarbon fuels have a carbon number of at least 5, including (but not limited to) kerosene-type jet fuels (such as JP8, Jet A, and Jet A-1), naphtha-type jet fuels (such as Jet Propellant B), fuel oils, waste oils, and diesel fuels.

FIG. 1 depicts control unit 100, which includes fuel control component 101, steam control component 102, oxygen control component 103, temperature control component 104, injection control component 105; and residence time control component 106. Conventional proportional controller and conventional proportional integral and derivative (PID) controllers may be utilized in the implementation of the control unit and control method shown in FIGS. 1 and 2. In addition, the optimal control parameters (e.g., steam to carbon ratios, oxygen to carbon ratios, reactor temperature, and reactant mixture rate) of the present control unit and control method may be varied, depending upon the size and geometry of the reformation reactor. The control unit may be implemented as a microchip, embedded software in an integrated circuit board, or CPU in conjunction with a reformation reactor.

As shown in FIG. 2, fuel control component 101 measures and adjusts the amount of hydrocarbon fuel that is injected into the reformation reactor (Step S201). In Step S202, steam control component 102 measures and adjusts the amount of steam that is injected into the reformation reactor. In Step S203, oxygen control component 103 measures and adjusts the amount of oxygen that is injected into the reformation reactor. In Step S204, temperature control component 104 measures and adjusts the temperature of the reformation reactor. In Step S205, injection control component 105 measures and adjusts the mixture rates of reactants in the reformation reactor. In Step S206, residence time control component 106 measures and adjusts the residence time of the reactants in the reformation reactor. If the syngas demand has been met or the available fuel has been depleted, control unit 100 signals the fuel reformation reactor to shut down. If syngas demand has not been met, the method in FIG. 2 continues again (in Step S207).

Residence time of the reactants in the reformation reactor may be adjusted using various methods, including (but not limited to) adjusting the pressure in the reformation reactor; adjusting the flow rate of the reactants injected into the reformation reactor; or adjusting the temperature of the reagents prior to being mixed and injected into the reformation reactor. The pressure in the reformation reactor may be adjusted by various methods, including (but not limited to) introducing an inert gas to the reformation reactor; adjusting the size of the outlet or outlets of the reformation reactor; and utilizing a reformation reactor configured with a dynamic or automated mechanism that adjusts the dimensions of the internal cavity of the reformation reactor.

In one exemplary embodiment of the present disclosure, the steam control component and fuel control component control the amount of steam and fuel injected into the reformation reactor to ensure that the steam to carbon ratio of the reformation reaction ranges from 0.1-1.0; 0.1-1.5; or 0.1-2.0. In another exemplary embodiment of the present disclosure, the oxygen control component and fuel control component control the amount of oxygen and carbon injected into the reformation reactor to ensure that the oxygen to carbon molar ratio ranges from 1.04-1.25; 0.9-1.3; or 0.8-1.4. In yet another embodiment of the present disclosure, the temperature control component controls the reactor temperature to ensure that the reactor temperature ranges from 900° C.-1200° C., or 800° C.-1200° C., or 700-1200° C. In an exemplary embodiment of the present disclosure, the injection control component controls the mixture rates of the reactants in the reformation reactor to ensure that the Damkohler number of the reformation reaction ranges from 0.0001-0.001; 0.0001-0.01; or 0.0001-0.1. In another exemplary embodiment of the present disclosure, the residence time control component controls the residence time of the reactants in the reformation reactor to ensure that this residence time ranges from 0.5 to 1.5 seconds; 0.75 to 1.5 seconds; or 1.0 to 1.5 seconds. Further details of the present method and system are described below, as well as in the following application and publications (which are hereby incorporated by reference): provisional U.S. patent application No. 62/518,854; Scenna R, Gupta AK. 2016. Wet Partial Oxidation of JP8 in a Well-Insulated Reactor. ASME. ASME Power Conference, ASME 2016 Power Conference. V001T03A009. doi:10.1115/POWER2016-59515.; Scenna R, Gupta AK. 2017. Dry and wet partial oxidation in a distributed reactor. International Journal of Hydrogen Energy. (42): 4102-4110; Scenna R, Gupta AK. 2018. The Influence of the Distributed Reaction Regime on Fuel Reforming Conditions. ASME. J. Energy Resour. Technol. doi:10.1115/1.4040404; and Scenna R. 2017. Non-Catalytic Thermal Reforming of JP-8 in a Distributed Reactor. Doctorate Dissertation, Department of Mechanical Engineering, University of Maryland, College Park.

Figure 3:
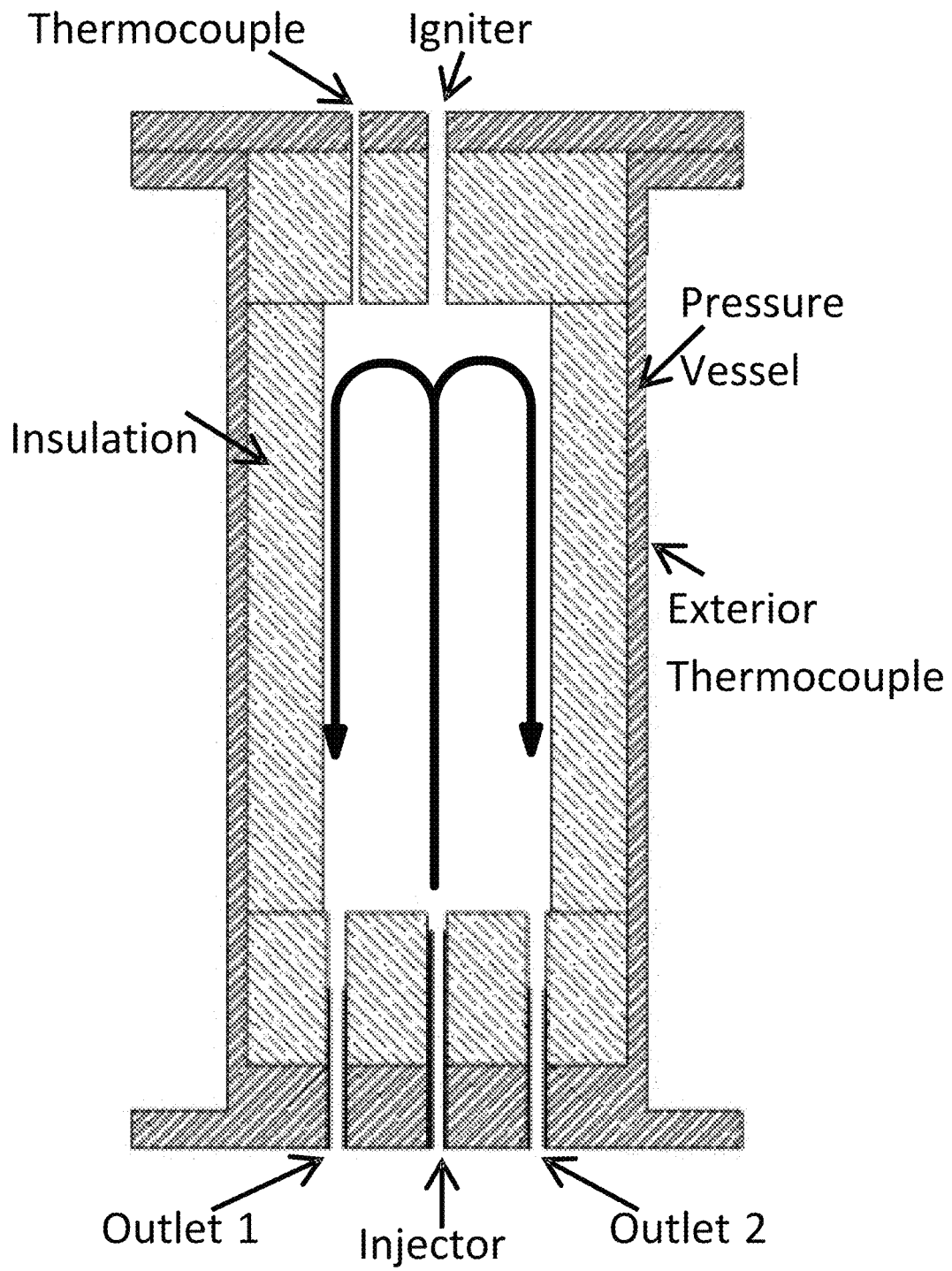
FIG. 3 is a diagram of an exemplary reformation reactor according to the present disclosure.

FIG. 3 is a diagram of a reactor used to reform fuel under a distributed reaction regime (described below in FIG. 4). The reactor includes at least two layers. The outermost layer includes a pressure vessel, which maintained the reactor pressure and allowed sealed connections to the reactor. The temperature of the pressure vessel layer may be maintained by an external heat source (such as a furnace or hot box). The external heat source may be controlled by temperature control component 104 or an external thermocouple as shown in FIG. 3. The external heat source promoted near adiabatic conditions by reducing the temperature gradient in the reactor. Alternatively, the reformation reactor may be incorporated into a fuel cell hot box. The inner layer includes an insulator material. Suitable insulator materials include, but are not limited to, high purity alumina insulation, high purity silica, cordierite, kyanite, sodium zirconium phosphate, silicon carbide, mullite zirconia, lithium silicate, refractory ceramic fibers, and ceramic foams. The inner insulator layer serves to protect the outer pressure vessel layer, retain heat, and prevent reduction of syngas.

The reactants may be injected through an injector. The injector may be located at a central location in the reactor (e.g., opposite an ignitor or equidistant from each exhaust outlet if there is more than one exhaust outlet. Injecting from a single central location allows uniform entrainment all around the injected jet. In an aspect of the present disclosure, the reactor was initiated through an igniter located opposite of the injector location. The product gases may be exhausted through one or more exhaust outlets. The exhaust outlets may be located on or near one end of the reactor that is the same end on which the injector is located.

In an embodiment of the present disclosure, a high molecular weight hydrocarbon fuels having a carbon number of at least 5, oxygen, and steam can be heated to a temperature ranging from 300 to 500° C. and mixed prior to injection into the reactor. The mixer was selected to minimize residence times (in the mixer) ranging from 1 to 3 milliseconds, while providing high mixing efficiency ranging from 99.5% to 99.99%, based on calculating 1 minus the ((standard deviation of the concentrations of the reactants)/ (mean of the concentrations of the reactants)). In one aspect of the present disclosure, the hydrocarbon fuel and steam flow rates are controlled to adjust to an oxygen to carbon ratio ranging from 0.8 to 1.4. In addition, the hydrocarbon fuel and steam flow rates are controlled to adjust to a steam to carbon ratio ranging from 0 to 2.0.

Reformate quality was monitored using a four channel gas chromatograph (GC) calibrated to three primary standards, each composed of 10-14 hydrocarbons. The gas chromatograph was able to detect hydrocarbons up to C6. Prior to the gas chromatograph, a filter and condenser were included to mitigate the transport of soot, particulates or water into the GC. A carbon balance (i.e., the ratio of carbon content in the product to the carbon content of the fuel) ranging from 95% to 100% was achieved.

Figure 4:
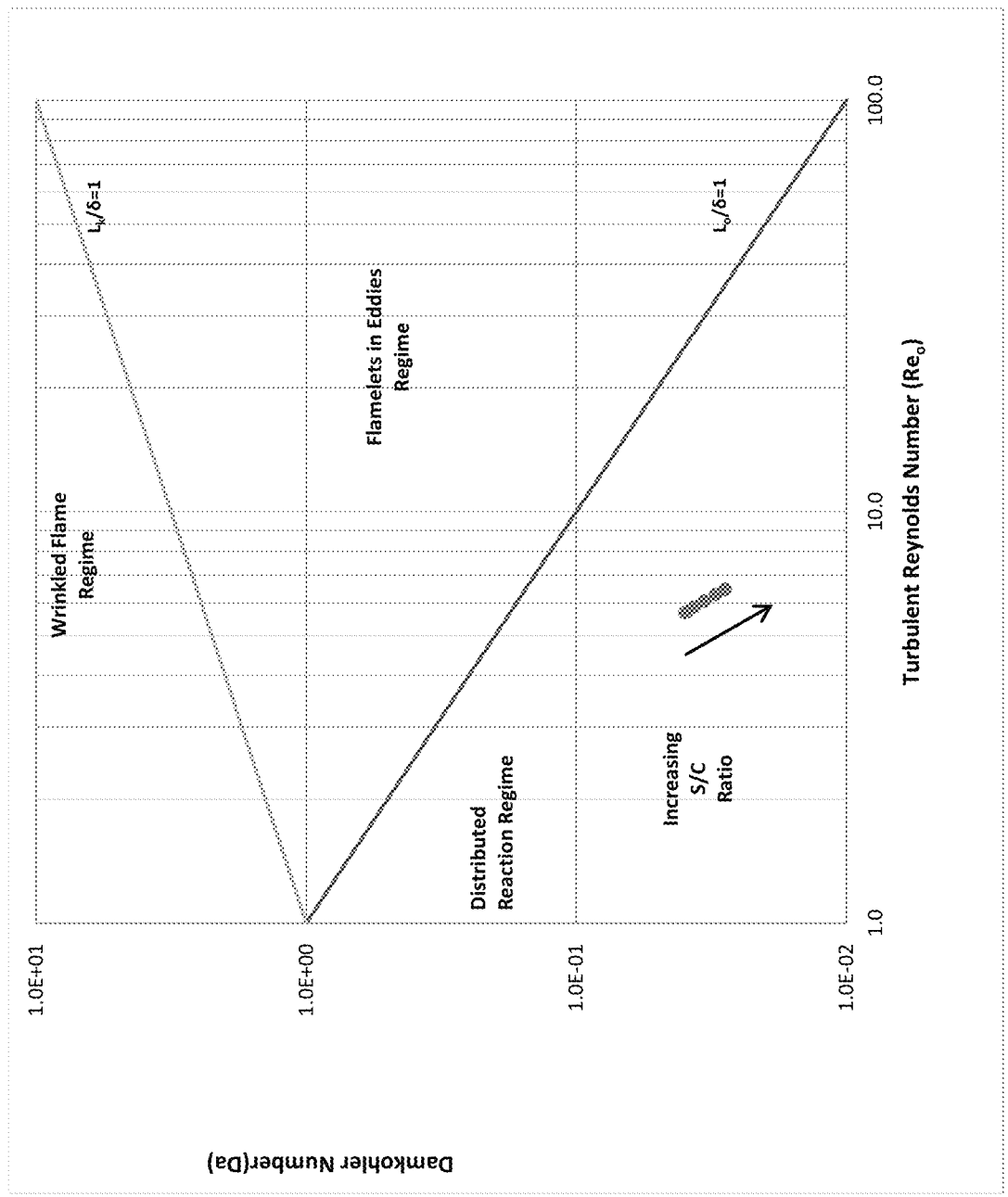
FIG. 4 is a graph presenting relevant flame regimes for various experimental conditions.

FIG. 4 is a Borghi plot presenting the relevant flame regime for various experimental conditions, as determined through numerical simulations in a quartz reactor. Flame regimes were determined from the Damkohler number (Da) and the turbulent Reynolds number ($Re_o$), which are defined in Equations 1 and 2. The Damkohler number and the turbulent Reynolds number are functions of integral length scale $\lambda_o$ (representing the mean diameter of the largest eddies in the flow), defined in Equation 8; turbulent velocity μ', defined in Equation 4; laminar flame speed $S_\lambda$; and laminar flame thickness δ, defined in Equation 5. Laminar flame thickness is a function of thermal diffusivity, α, and laminar flame speed.

$$Da = \frac{\tau_{mix}}{\tau_{chem}} = \left(\frac{l_o}{\delta}\right)\left(\frac{S_l}{u'}\right) \quad \text{(Eq. 1)}$$

$$Re_o = \frac{u' l_o}{S_l \delta} \quad \text{(Eq. 2)}$$

$$l_o = \frac{u'}{\varepsilon} \quad \text{(Eq. 3)}$$

$$u' = \left(\frac{2}{3}k\right)^{1/2} \quad \text{(Eq. 4)}$$

$$\delta = \frac{2\alpha}{S_l} \quad \text{(Eq. 5)}$$

The Damkohler number represents the ratio of the mixing time scale ($\tau_{mix}$) to the characteristic chemical time scale ($\tau_{chem}$). Qualitatively, this means for Da>>1, mixing (or "transport") is much slower than the chemical reaction. Under this regime, mixing characteristics are much more important than reaction time in defining a steady-state chemical distribution over length and time scales of interest.

Conversely, for Da<<1, the opposite is true and mixing (or "transport") is much faster than the chemical reaction. The integral length scale is sufficiently shorter than laminar flame thickness and the turbulent eddies are small enough to remain within the flamelet. The present disclosure relates to the use of a distributed reaction regime, in which the Damkohler number is significantly less than 1. In an exemplary embodiment of the present disclosure, Damkohler numbers are controlled at the following ranges: 0.0001-0.001; 0.0001-0.01; and 0.0001-0.1.

In one embodiment of the present disclosure, the distributed reaction regime may be achieved by injecting the oxygen-fuel mixture into the reactor through a high velocity jet (or other equivalent methods for facilitating rapid mixture of oxygen and a hydrocarbon fuel), entraining the exhaust products into the mixture before ignition can occur. Specifically, the distributed reaction regime is believed to promote both steam and dry reforming reactions to improve reformate quality through entraining heat, carbon dioxide, and steam into the premixed fuel air charge. The entrainment of exhaust products reduces local oxygen concentrations and allows a uniform thermal field to develop. The Distributed Reaction Regime's uniform thermal field reduces the thermal stress on the insulation over that of a conventional non-catalytic reactor. The Distributed Reaction Regime suppresses soot in the reactor, while conventional non-catalytic reformers (those not operating under distributed conditions) employ high reactor temperatures, but this promotes soot formation and reduces reforming efficiency. When ignition occurs, this increases $\tau_{chem}$. The high velocity jet promotes a more rapid mixing, which reduces the $\tau_{mix}$ associated with turbulent transport. This decreases Damkohler number, giving rise to Distributed Reaction Regime conditions. A transparent flame indicated that the reactor operated within the Distributed Reaction Regime.

Integral length scale and turbulent velocity are functions of volume averaged turbulent kinetic energy (k) and turbulent energy dissipation (ε). These properties were calculated using conventional computational fluid dynamics (CFD) simulation software. Laminar flame thickness and flame speed were determined using conventional chemical kinetics software.

Figure 5:
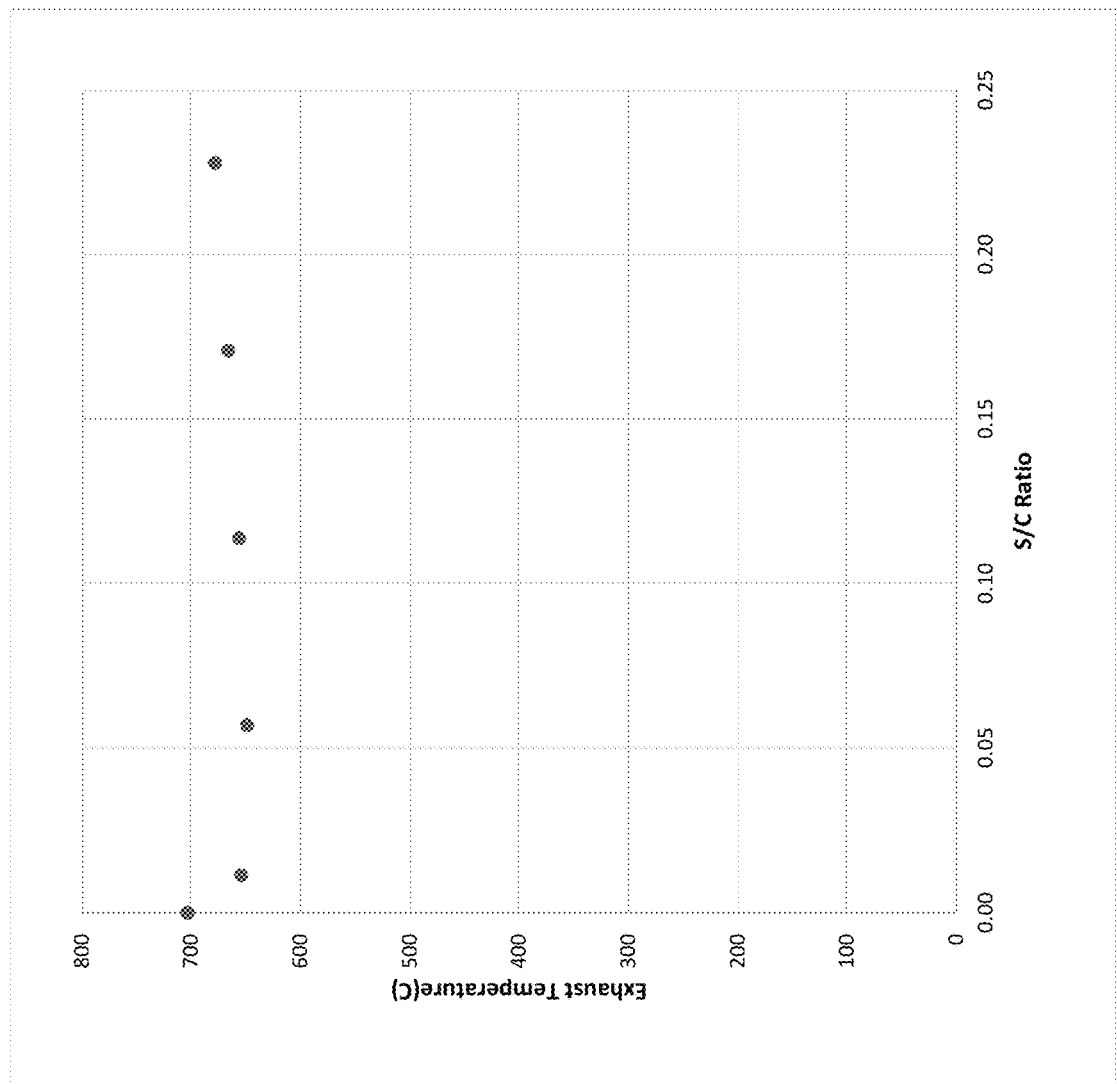
FIG. 5 is a graph showing the effect of S/C ratio on average exhaust temperature under dry and wet partial oxidation conditions.

In FIGS. 5-22, a non-catalytic reformation method (according to the present disclosure) is used to reform jet propellant 8 (or JP-8). FIG. 5 is a graph showing the effect of steam to carbon (S/C) ratio on exhaust temperature under dry (i.e., no steam) and wet (i.e., with the presence of steam) partial oxidation conditions (described in greater detail below). Partial oxidation yields $H_2$- and CO-rich syngas, while full oxidation yields largely $CO_2$ and $H_2O$. Addition of steam leads to a sharp decrease in exhaust temperature, which indicates that endothermic reactions occur in the reactor. When steam to carbon ratios exceed 0.1, the exhaust temperatures increase as the S/C ratio increases. The increase in temperature is attributed to the role of steam in assisting development of uniform thermal field in the reactor. However, when the S/C ratio exceeds 2.0 (or lower depending on the reformation reactor design), the peak reactor temperature decreases with an increase in steam content.

Figure 6:
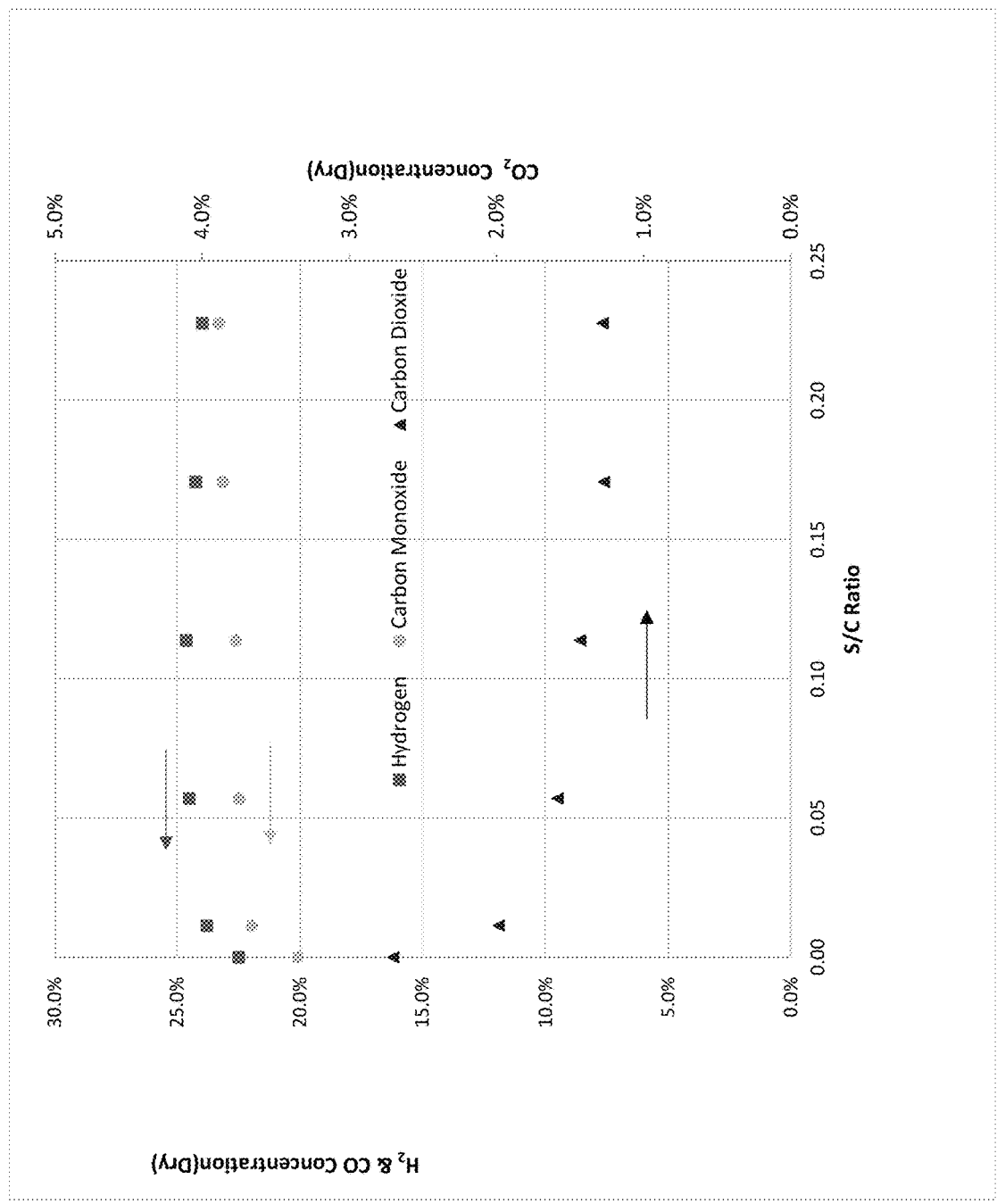
FIG. 6 is a graph showing the effect of S/C ratio on syngas composition under dry and wet partial oxidation conditions.

FIG. 6 is a graph showing the effect of S/C ratio on syngas composition under dry and wet partial oxidation conditions. The addition of steam increased syngas quality, yielding syngas consisting of 22.5-24.6% $H_2$ and 20.1-23.3% CO, in contrast to conventional methods without steam, which typically yield only about 13% $H_2$ and 19% CO. Even with trace amounts of steam (at S/C=0.01), the reformer demonstrated a drastic increase in both $H_2$ and CO concentrations. At S/C=0.11, $H_2$ concentration peaked. For S/C ratios greater than 0.11, $H_2$ concentration declined as S/C increased. This decline in $H_2$ concentration was expected due to the combined effects of quenching and reduced residence times.

Higher S/C ratios resulted in increased CO concentrations and in decreased $CO_2$ concentrations. The high concentrations of CO and low concentrations of $CO_2$ indicate complete mixing had occurred. This is because poor mixing leads to oxygen-rich regions (which yield $CO_2$) and low-oxygen regions (which yield lower hydrocarbons such as ethylene and methane). In contrast, complete mixing of oxygen and other reagents leads to the formation of CO. Operating at a low S/C ratio increases sustainability in a mobile power system. Lower water usage from steam reduces storage needs and water recovery from the fuel cell, which in turn reduces system weight and cost.

Figure 7:
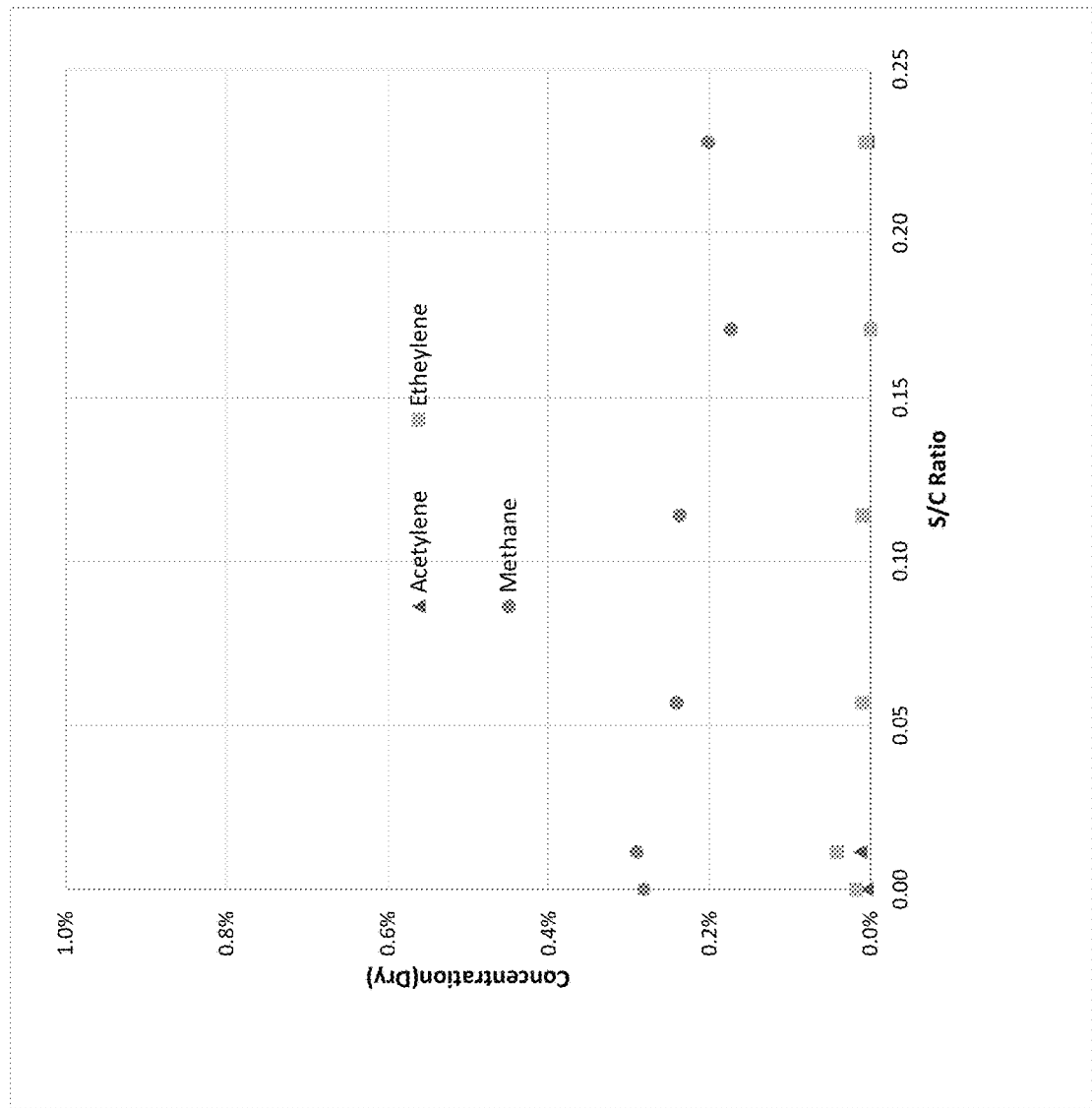
FIG. 7 is a graph showing the effect of S/C ratio on the concentration of lower molecular weight hydrocarbons (acetylene, ethylene, and methane).

FIG. 7 is a graph showing the effect of S/C ratio on the concentration of lower molecular weight hydrocarbons (such as acetylene, ethylene, and methane). Although trace amounts of steam (S/C=0.01) resulted in a small initial increase in lower molecular weight hydrocarbons, this increase is thought to be from pulsation in the pump (resulting in steam content fluctuation). With
the exception of this initial increase, steam impeded hydrocarbon formation. Accordingly, the present method and system controls the S/C molar ratio at the following ranges: 0.1-1.0; 0.1-1.5; and 0.1-2.0.

Figure 8:
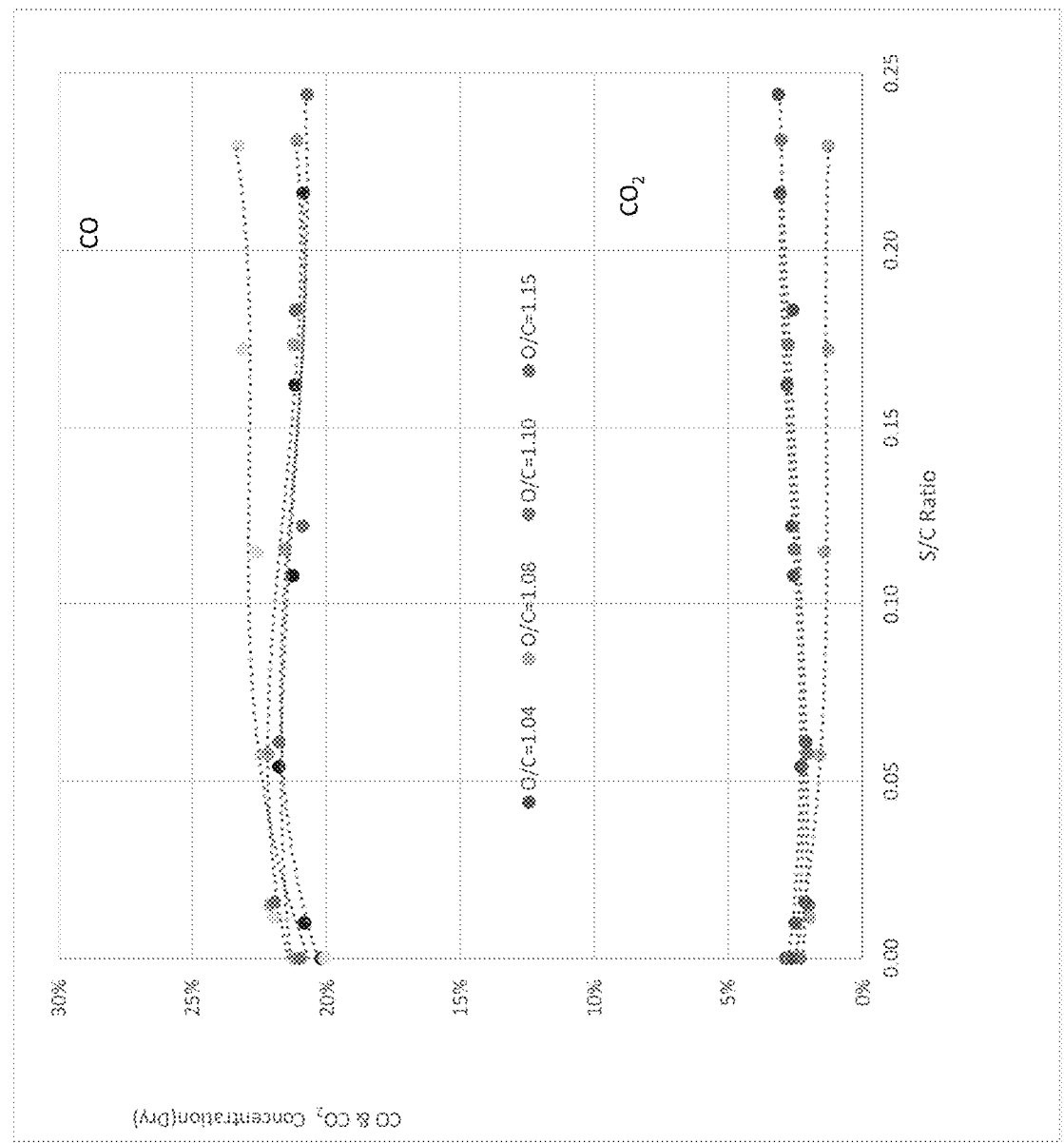
FIG. 8 is a graph showing the effect of S/C ratio on the concentration of methane using four different O/C ratios.
Figure 9:
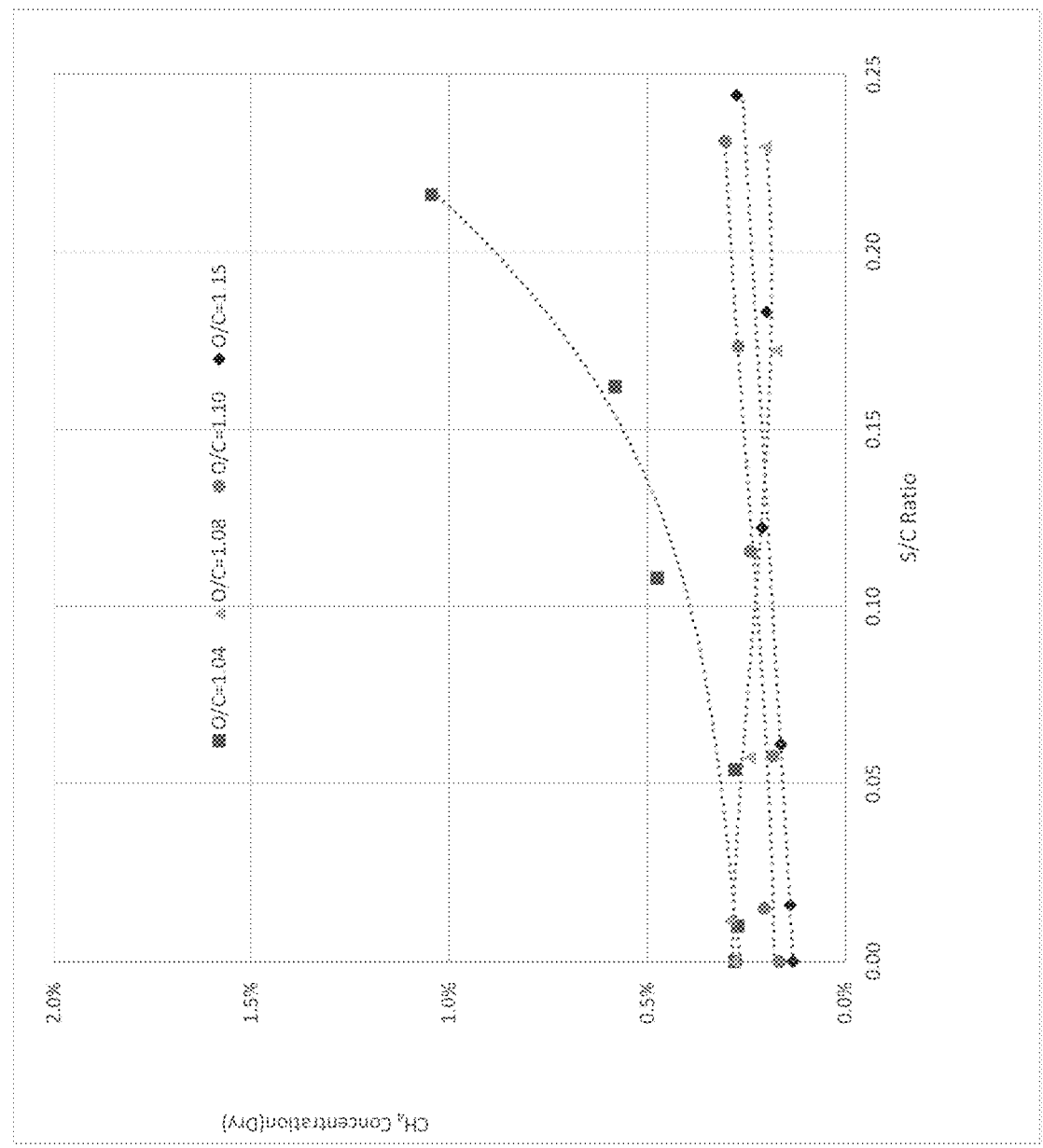
FIG. 9 is a graph showing the effect of S/C ratio on the concentration of acetylene using four different O/C ratios.
Figure 10:
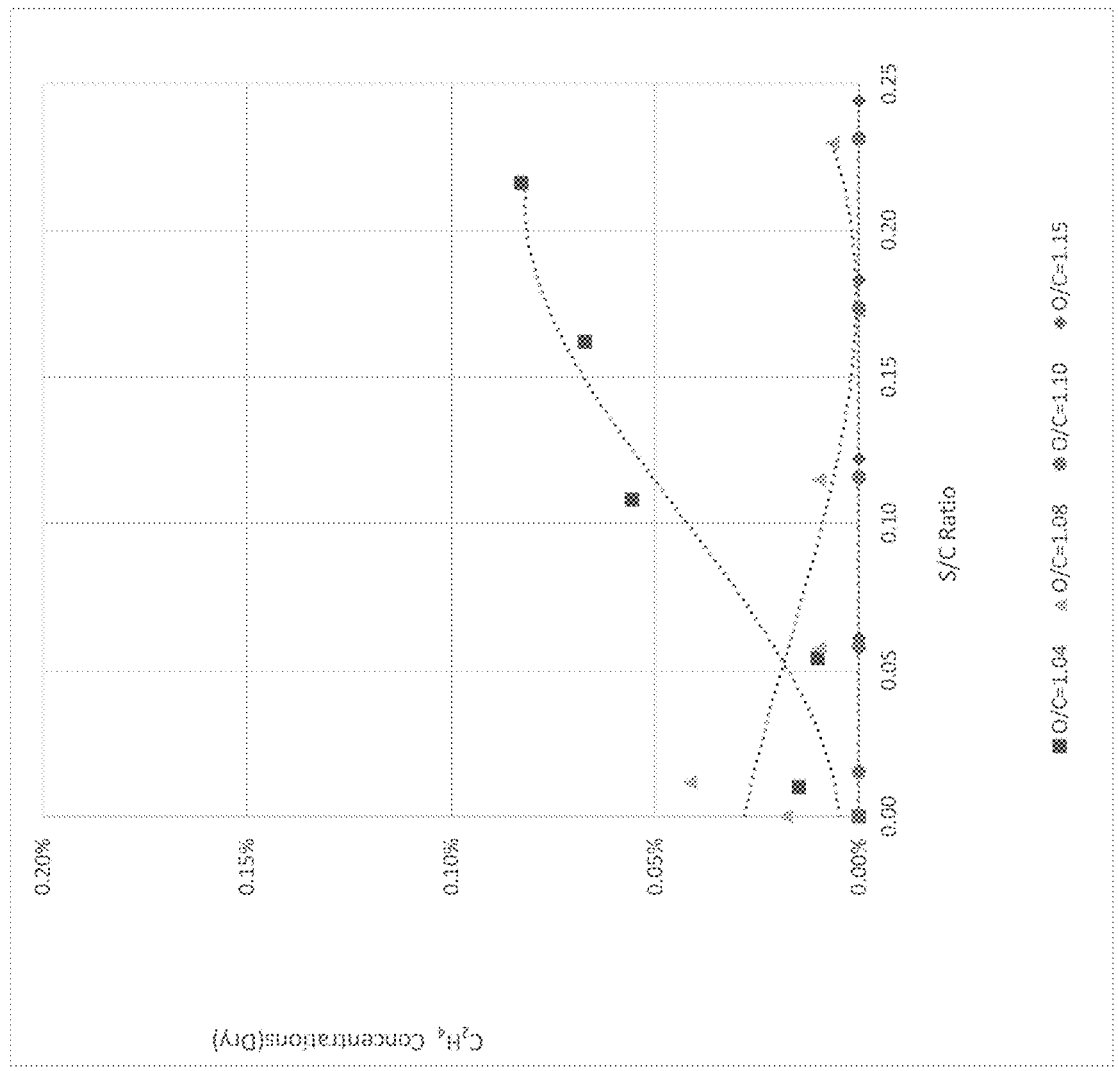
FIG. 10 is a graph showing the effect of S/C ratio on the concentration of ethylene using four different O/C ratios.

Hydrocarbons having a carbon number greater than ethylene were not detected. Of the three detected hydrocarbons, only methane was detected in finite amounts (0.17-0.29%); acetylene and ethylene were detected in trace amounts (0.01-0.04%). FIG. 8 shows the effect of S/C ratio on the concentration of methane using four different oxygen to carbon ratios (O/C) of 1.04, 1.08, 1.10, and 1.15. For an O/C ratio of 1.04, the excess steam promoted methane formation at S/C ratios in excess of 0.1. Accordingly, the present method and system controls oxygen to carbon molar ratios at the following ranges: 1.04-1.25; 0.9-1.3; and 0.8-1.4. FIG. 9 shows the effect of S/C ratio on the concentration of acetylene at O/C=1.04, 1.08, 1.10, and 1.15. For an O/C ratio of 1.04, the excess steam promoted acetylene formation at S/C ratios in excess of 0.1. FIG. 10 shows the effect of S/C ratio on the concentration of ethylene at O/C=1.04, 1.08, 1.10, and 1.15. For an O/C ratio of 1.04, the excess steam promoted ethylene formation at S/C ratios in excess of 0.1.

Figure 11:
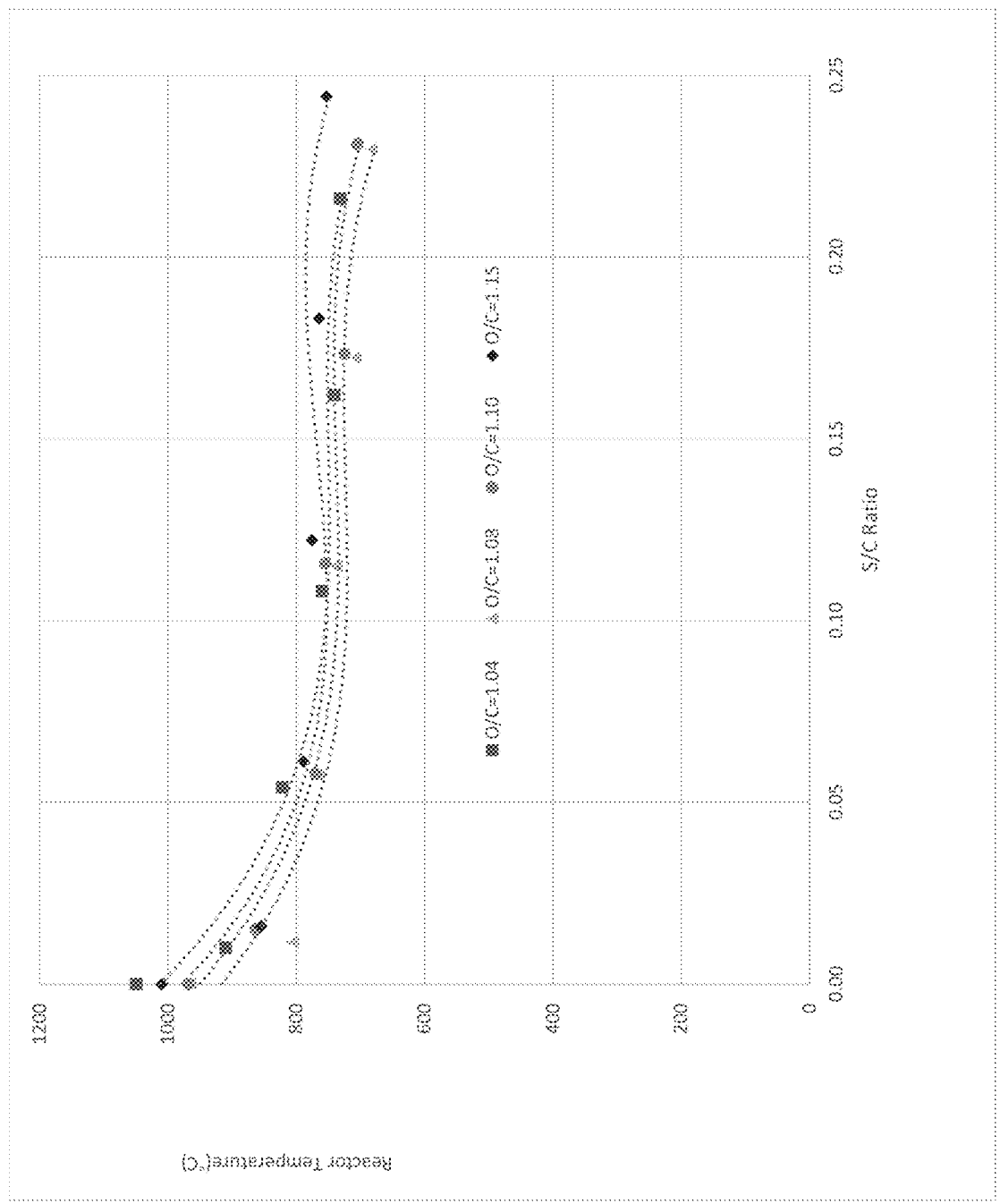
FIG. 11 is a graph showing the effect of S/C ratio on $H_2$ concentration using four different O/C ratios.

FIG. 11 shows the effect of S/C ratio on $H_2$ concentration at O/C=1.04, 1.08, 1.10, and 1.15. Reformate chemical composition is the result of the balance between the faster, highly exothermic partial oxidation reaction ($R_1$), the slower endothermic steam reaction ($R_2$), and water gas shift reaction ($R_3$). Reactions $R_1$ and $R_2$ may be concurrent or reaction $R_2$ may occur subsequent to reaction $R_1$; in addition, reaction $R_3$ may be concurrent with reactions $R_1$ and $R_2$ or reaction $R_3$ can occur subsequent to reactions $R_1$ or $R_2$.

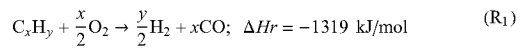

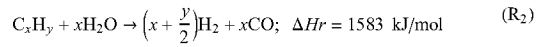

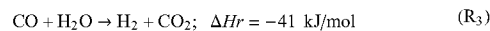

Partial oxidation is the exothermic reaction of the high molecular weight hydrocarbon fuel with reduced amounts of oxygen so that the reactions do not proceed to complete oxidation. This is a rapid reaction, occurring within time scales of 20-100 ms. Inadvertently, some hydrogen will oxidize to form steam, reducing syngas yields. According to an exemplary embodiment of the present disclosure, the residence times (during mixing) greatly exceeds the time scales needed for partial oxidation reaction (20-100 ms), allowing steam reforming and water gas shift reactions to occur.

The steam reforming reaction $R_2$ is desirable because it generates higher yields of $H_2$ than $R_1$, but it is limited by its endothermic nature and potential quenching. Conversely, the partial oxidation reaction $R_1$ is an exothermic reaction, but it produces lower yields of $H_2$. If excess steam is available after the oxidative and steam reforming reactions $R_1$ and $R_2$, the water gas shift reaction $R_3$ can shift the composition of reformate to produce additional $H_2$. The faster oxidative reaction $R_1$ is considered to occur before the slower steam reforming water gas shift reactions $R_2$ and $R_3$. Under ideal conditions, only a limited amount of fuel will be oxidized in $R_1$ to generate the heat necessary for the endothermic steam reforming reaction $R_2$. However, the reactor temperature must be maintained so as not to reduce the overall reaction rate.

In addition to controlling the S/C ratio in exemplary embodiments of the present disclosure, the amount of oxygen must be carefully controlled to optimize reformate quantity and quality. Excess oxygen will increasingly oxidize fuel, thereby reducing the amount of fuel available in undergoing the steam reforming reaction $R_2$. Excess oxygen also has the potential to oxidize reformate. However, insufficient oxygen reduces both reactor temperature and activity of steam reforming reactions, resulting in reduced conversion.

FIG. 11 shows that at an O/C=1.08 is associated with a $H_2$ concentration of 24%, which is similar to that of a conventional catalytic reformer and demonstrates the feasibility of employing a non-catalytic reforming approach as a replacement for catalytic reformers in solid oxide fuel cell systems. Yet, an increase in the amount of $O_2$ caused a reduction in $H_2$. For a constant S/C ratio of 0.11, increasing O/C ratios from 1.04 to 1.15 decreased hydrogen concentrations from 24.5±0.25% to 23.0±0.23%.

Figure 12:
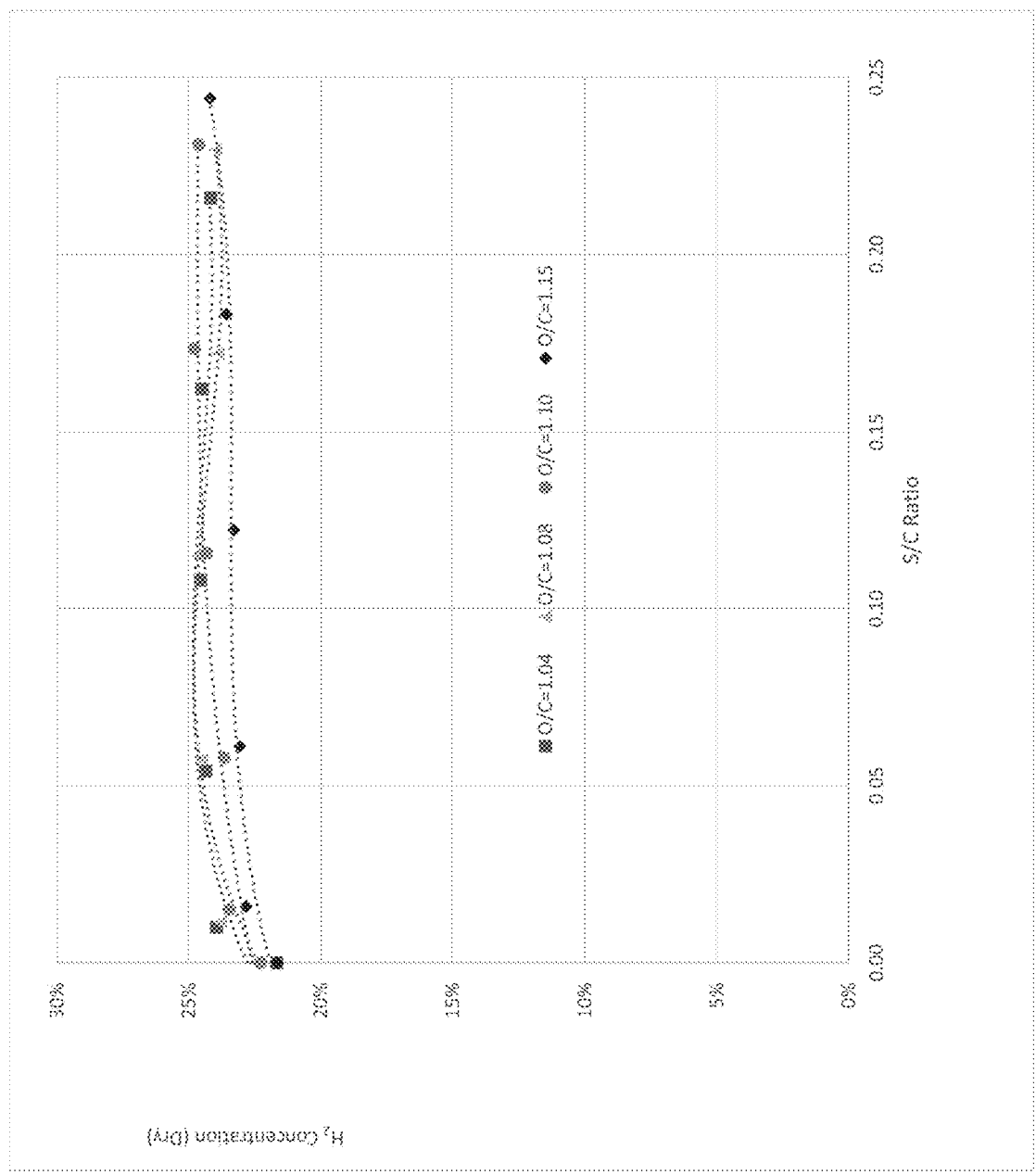
FIG. 12 is a graph showing the effect of S/C ratio on $CO_2$ concentration and on CO concentration using four different O/C ratios.

FIG. 12 shows the effect of S/C ratio on $CO_2$ concentration and on CO concentration at O/C=1.04, 1.08, 1.10, and 1.15. Excess oxygen appears to impact the formation of $H_2$ more than the formation of CO. Since the distributed reactor entrains hot reactive gases prior to ignition, hydrogen is more readily oxidized than other gases (e.g., CO, $CH_4$, and $C_2H_2$), which causes a more pronounced effect on the amounts of $H_2$ concentration.

Figure 13:
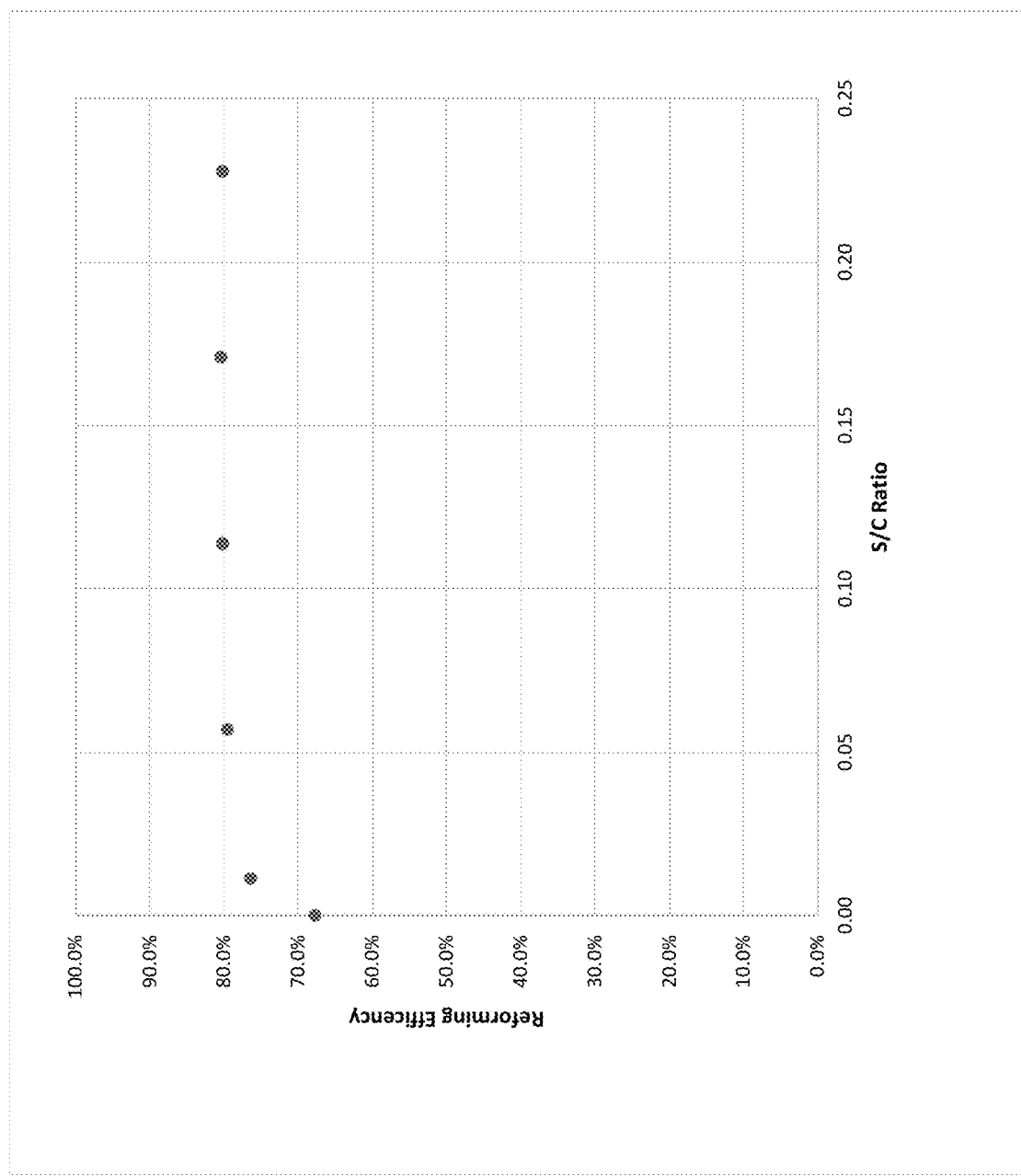
FIG. 13 is a graph showing the effect of S/C ratio on reforming efficiency.

FIG. 13 shows the effect of S/C ratio on reforming efficiency ($\eta_{ref\,f}$). Reforming efficiency is a function of the $H_2$ and CO yields, and thus relates to reformate quality. Reforming efficiency is defined as the ratio of the lower heating value (LHV) of each component of the syngas times the respective molar flow rates of each syngas component ($\dot{N}_{H_2}$ and $\dot{N}_{co}$) to the lower heating value of the fuel times the molar flow rate of the fuel:

$$\eta_{reff} = \frac{\dot{N}_{H_2} * LHV_{H_2} + \dot{N}_{CO} * LHV_{CO}}{\dot{N}_{Fuel} * LHV_{Fuel}} \quad \text{(Eq. 6)}$$

Reforming efficiency is a measure of the energy retained in the syngas after the reforming process. At an oxygen to carbon ratio of one and assuming only carbon is oxidized, the maximum reforming efficiency was found to be 85.6%.

FIG. 13 demonstrates that even with trace amounts of steam (S/C=0.01), reforming efficiency rapidly increased. When the reactor operated under dry partial oxidation, it demonstrated a reforming efficiency of 67.74%.

At S/C=0.17, the reactor reaches peak efficiency ($\eta_{ref\,f}$=80.35%), with negligible change at higher S/C ratios ($\eta_{ref\,f}$=80.15%). Peak reactor efficiency occurs in between peak $H_2$ amounts (at S/C=0.11) and peak CO amounts (at S/C=0.23). This is expected, as reforming efficiency is the product of $H_2$ and CO yields. The addition of steam reduces deposition of soot in the exhaust line.

Figure 14:
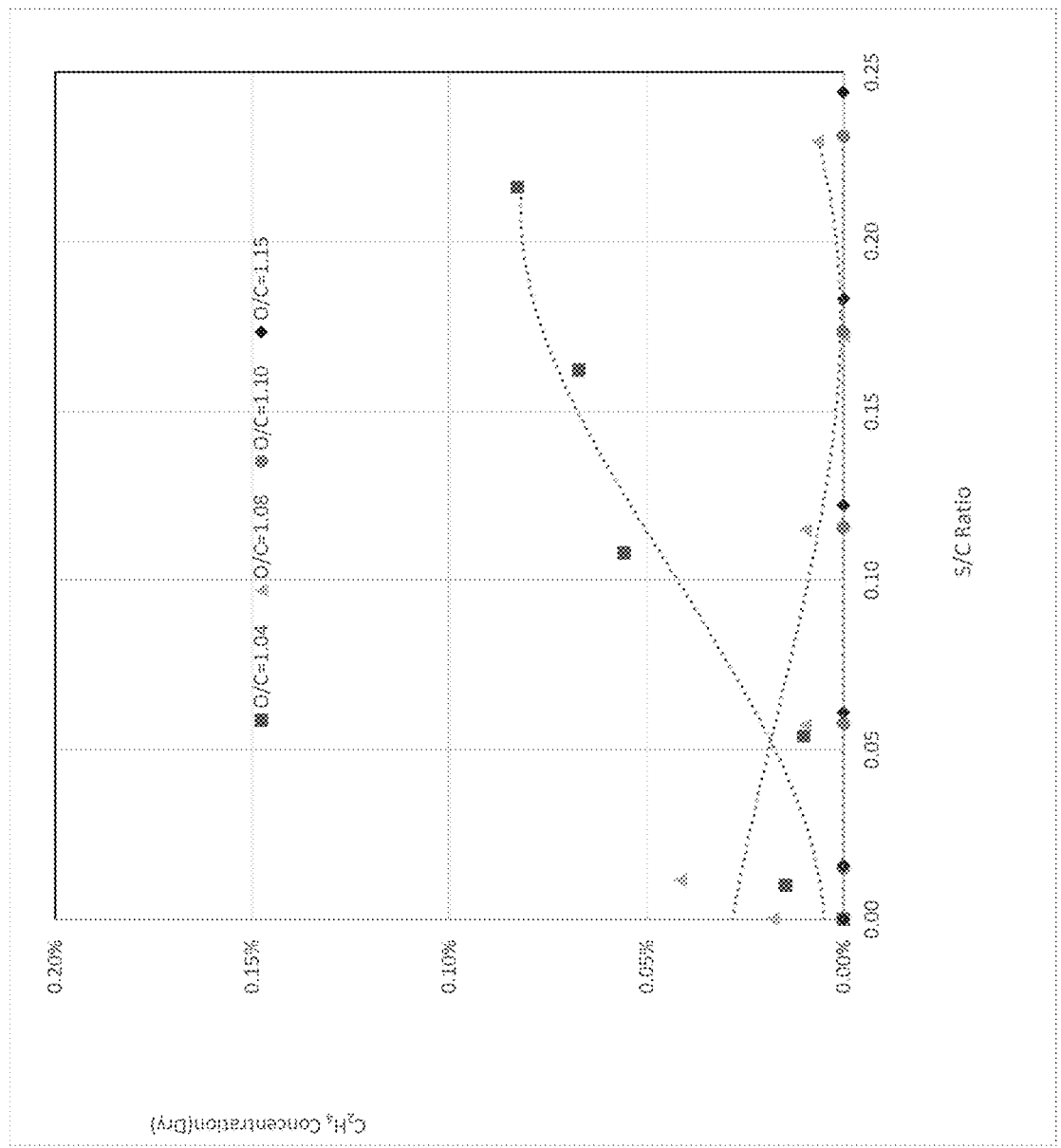
FIG. 14 is a graph showing the effect of S/C ratio on reforming efficiency using four different O/C ratios.

FIG. 14 shows the effect of S/C ratio on reforming efficiency at O/C=1.04, 1.08, 1.10, and 1.15. At an O/C=1.08, the reactor demonstrated a reforming efficiency of 81%, which is similar to that of a conventional catalytic reformer.

Figure 15:
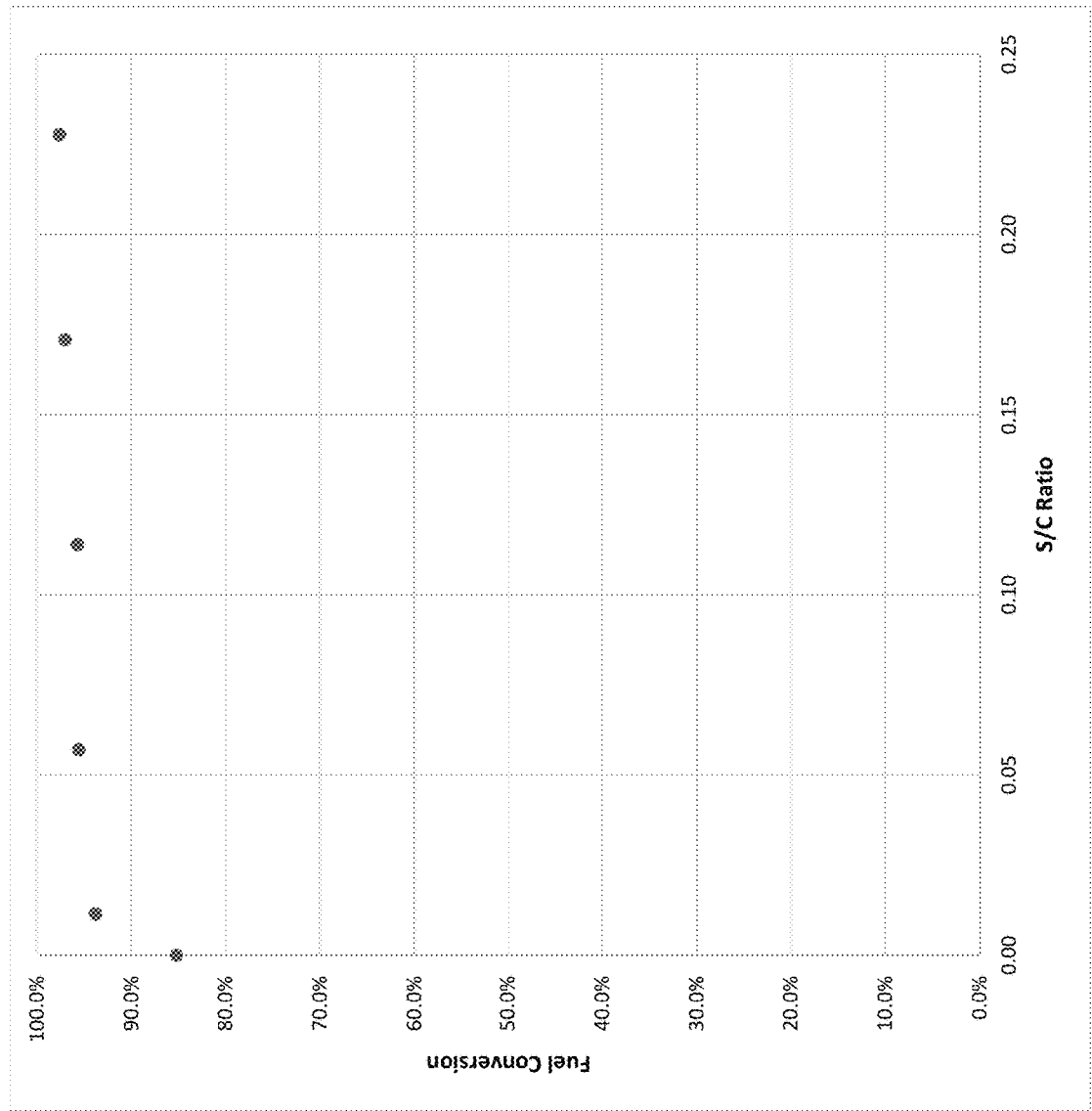
FIG. 15 is a graph showing the effect of S/C ratio on fuel conversion.

FIG. 15 shows the effect of S/C ratio on fuel conversion ($\eta_{conv}$), which, along with reforming efficiency, is an indication of reformate quality. Fuel conversion is defined as the ratio of the sum of the moles of carbon monoxide and moles of carbon dioxide to the number of moles of carbon initially contained in the fuel:

$$\eta_{conv} = \frac{CO+CO_2}{\text{fuel carbon content}} \quad \text{(Eq. 7)}$$

The formation of lower molecular weight hydrocarbons and soot will result in less than 100% conversion.

FIG. 15 shows that even with trace amounts of steam (S/C=0.01), fuel conversion rapidly increased, peaking at S/C=0.23. When the reactor operated under dry partial oxidation, it demonstrated a fuel conversion of 85.18% (at an O/C ratio of 1.05). These results, along with the reforming efficiency trends described in FIG. 13, demonstrates that soot deposition occurred in the exhaust line under dry partial oxidation conditions (which are contrary to the conditions in the present method and system). In the present method and system, the distributed reaction regime suppresses soot in the reactor; the presence of soot in the exhaust line therefore indicates that the reformate passing through the exhaust line may not be under the distributed reaction regime.

Figure 16:
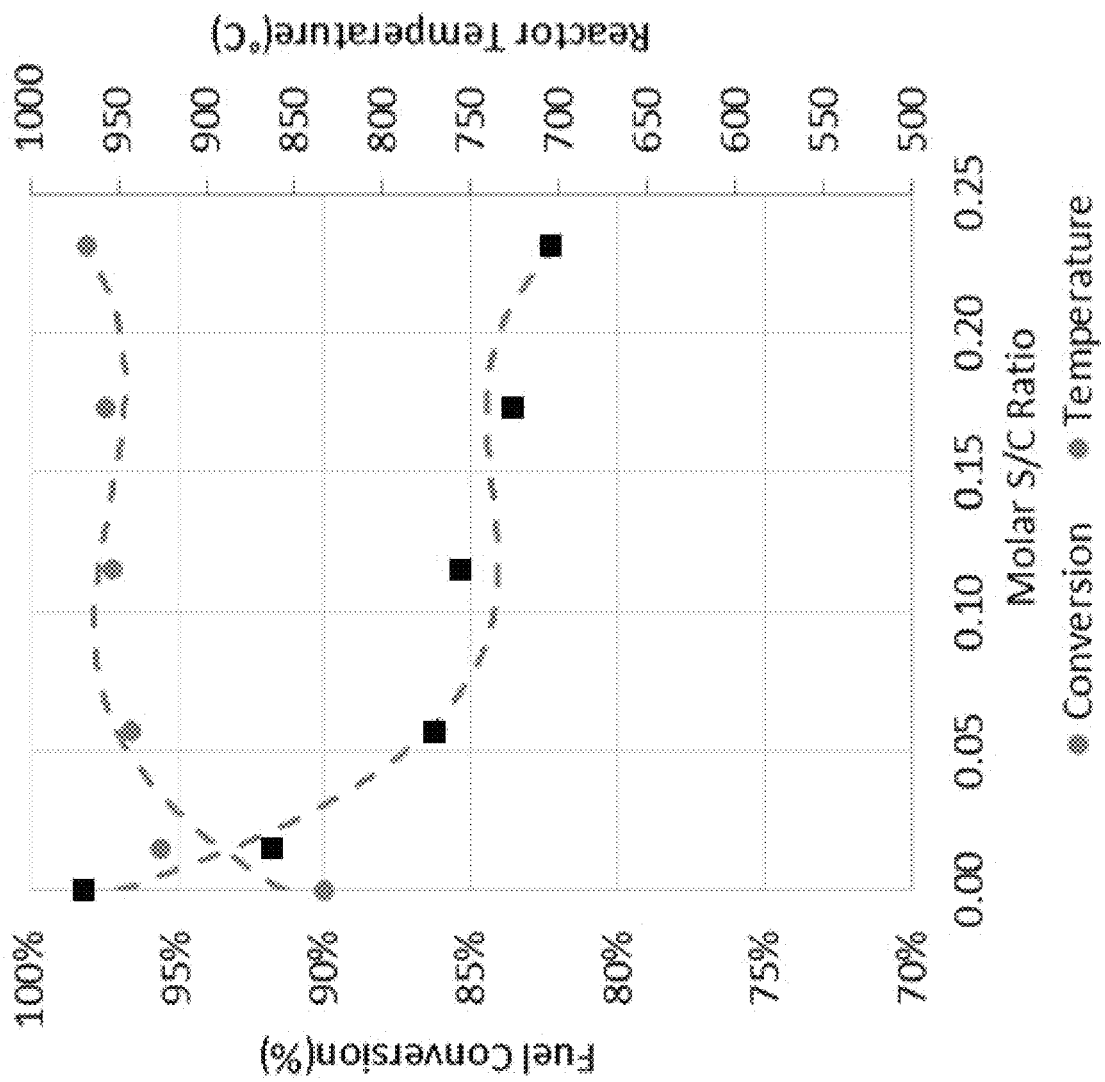
FIG. 16 is a graph showing the effect of S/C ratio on fuel conversion and reactor temperature.

FIG. 16 shows the effect of S/C ratio on fuel conversion and reactor temperature. FIG. 16 shows that the addition of steam (S/C=0-0.10) reduced the reactor temperatures from 1000° C. to 755° C., while increasing the conversion from 90% to 97%, thus indicating that the endothermic steam reforming reactions were taking place. Further increase in steam content did not significantly improve the conversion or show such a rapid decrease in reactor temperature.

Figure 17:
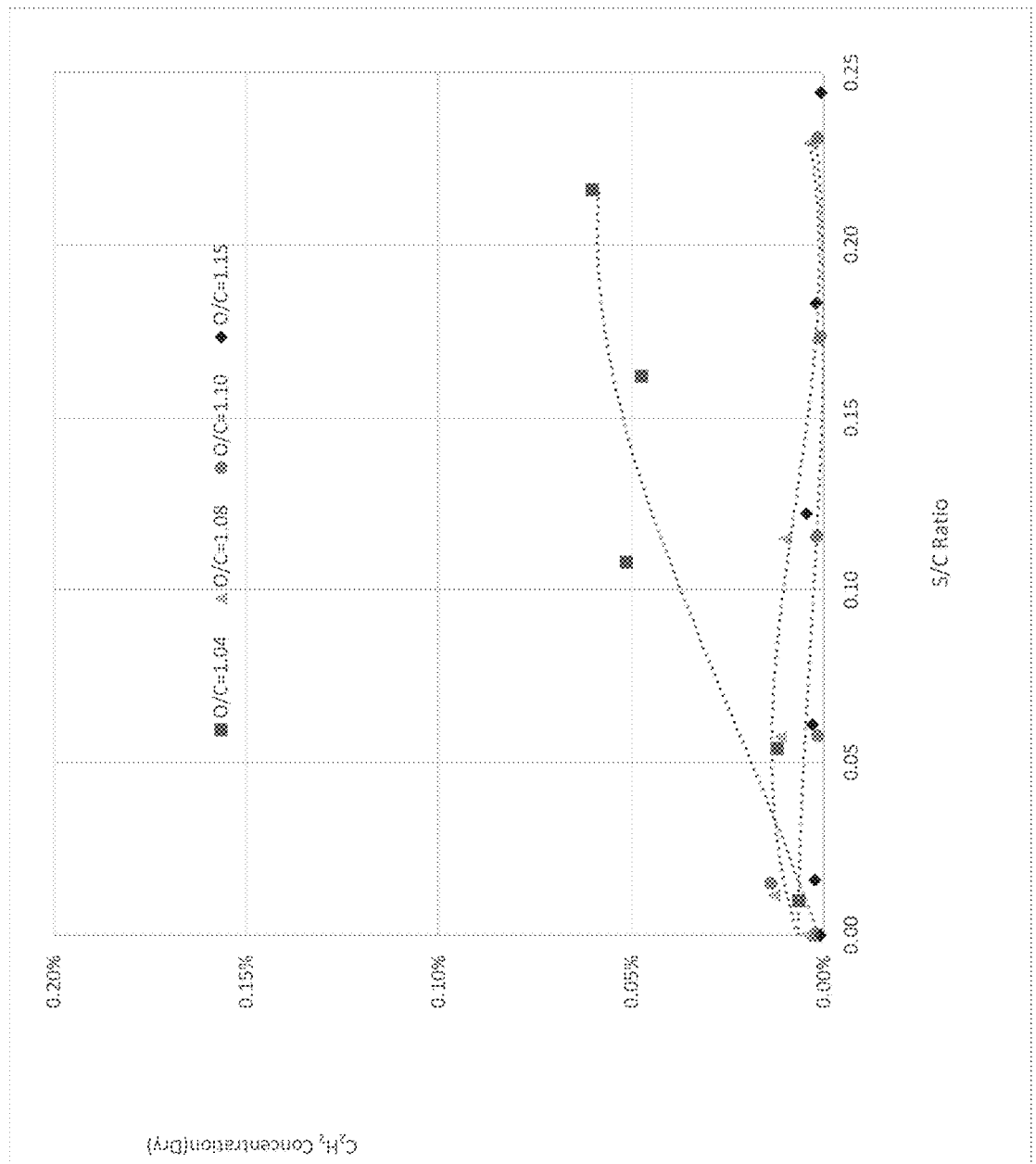
FIG. 17 is a graph showing the effect of S/C ratio on fuel conversion at four different O/C ratios.

FIG. 17 shows the effect of S/C ratio on fuel conversion at four different oxygen to carbon ratios (O/C=1.04, 1.08, 1.10, and 1.15). Fuel conversion increased as O/C ratios increased. This was most notable at S/C=0 to 0.05, wherein the conversion was low. At O/C=1.04, there was insufficient oxygen for full conversion. Under these conditions with partial oxidation of the fuel, the addition of steam was only beneficial when S/C=0.01 to 0.10. When S/C>0.10, the excess steam promoted the formation of lower molecular weight hydrocarbon fuels such as methane and acetylene, while reducing $H_2$ concentrations. This was attributed to reduced reactor temperatures caused by the excess steam (as discussed above with respect to FIGS. 8 and 9).

Figure 18:
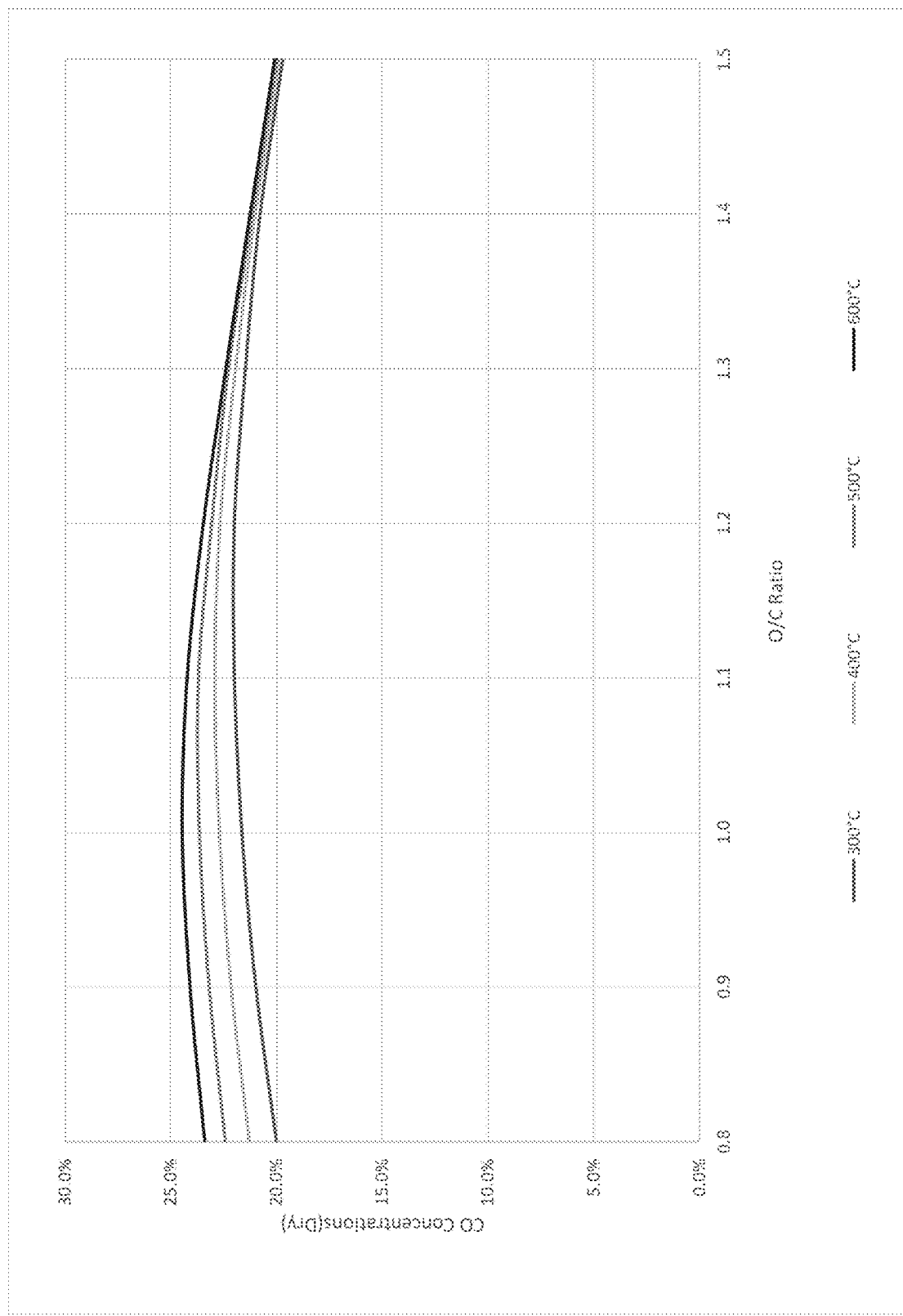
FIG. 18 is a graph showing the effect of O/C ratio on $H_2$ concentration at four different temperatures.
Figure 19:
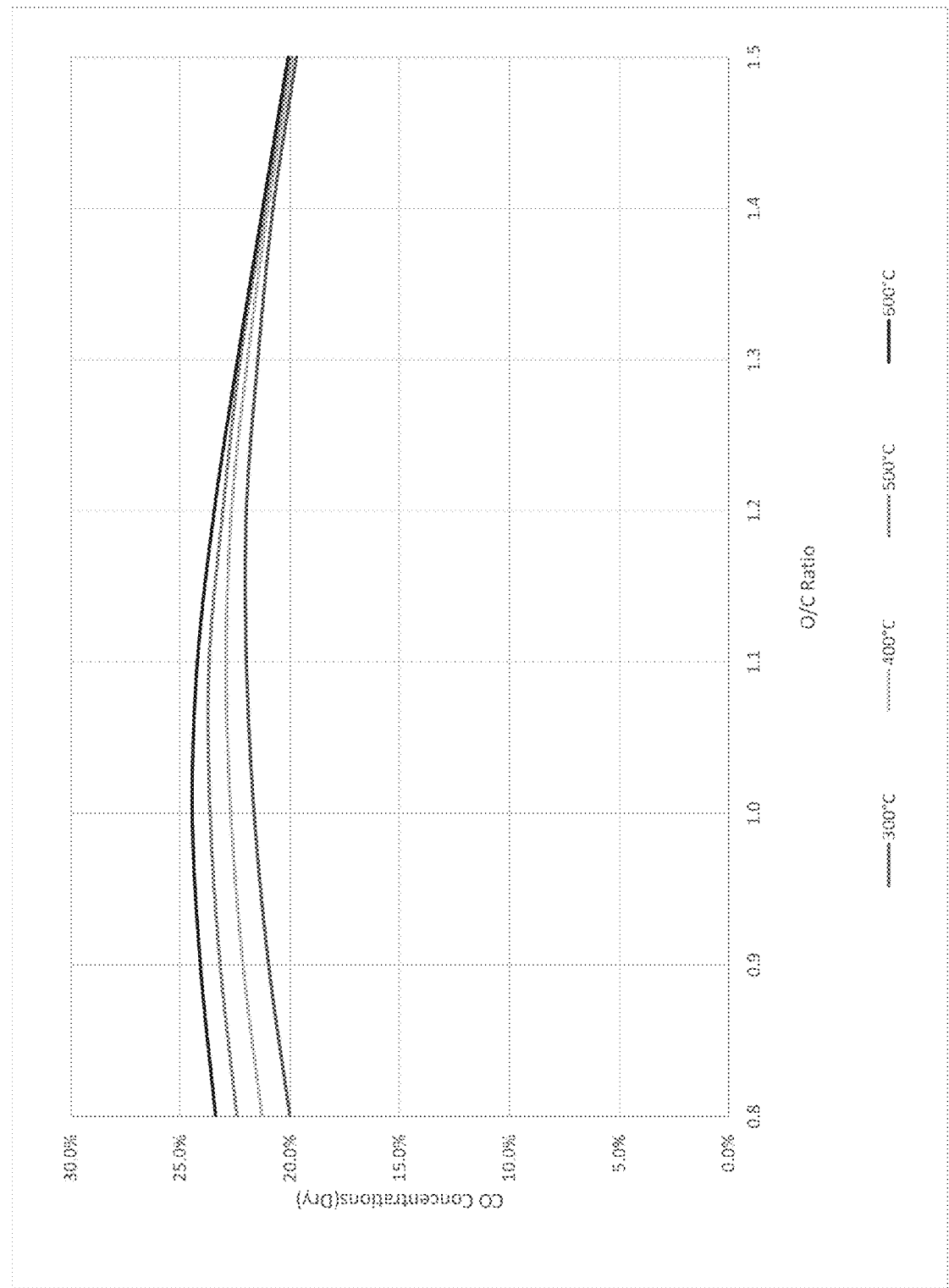
FIG. 19 is a graph showing the effect of O/C ratio on CO concentration at four different temperatures.

FIGS. 18 and 19 show simulated hydrogen and carbon monoxide concentrations for a distributed reactor. Inlet temperatures were evaluated between 300-600° C. and O/C ratios between 0.80-1.30. FIG. 18 shows that hydrogen concentrations ranged from 13.5 to 23.4%. At 300° C., peak hydrogen concentrations occurred at an O/C ratio of one, but as injection temperatures increased, peak hydrogen concentrations occurred at lower O/C ratios. Increasing the O/C ratios caused a gradual increase in hydrogen concentrations. As shown in FIG. 19, carbon monoxide concentrations ranged from 19.7 to 24.5%. At 300° C., peak carbon monoxide (CO=22.0%) occurred at O/C ratios of 1.1 to 1.2. As injection temperatures increased, peak carbon monoxide concentrations increased and occurred at lower oxygen to carbon ratios. Peak carbon monoxide concentrations occurred near the point of full conversion.

Figure 20:
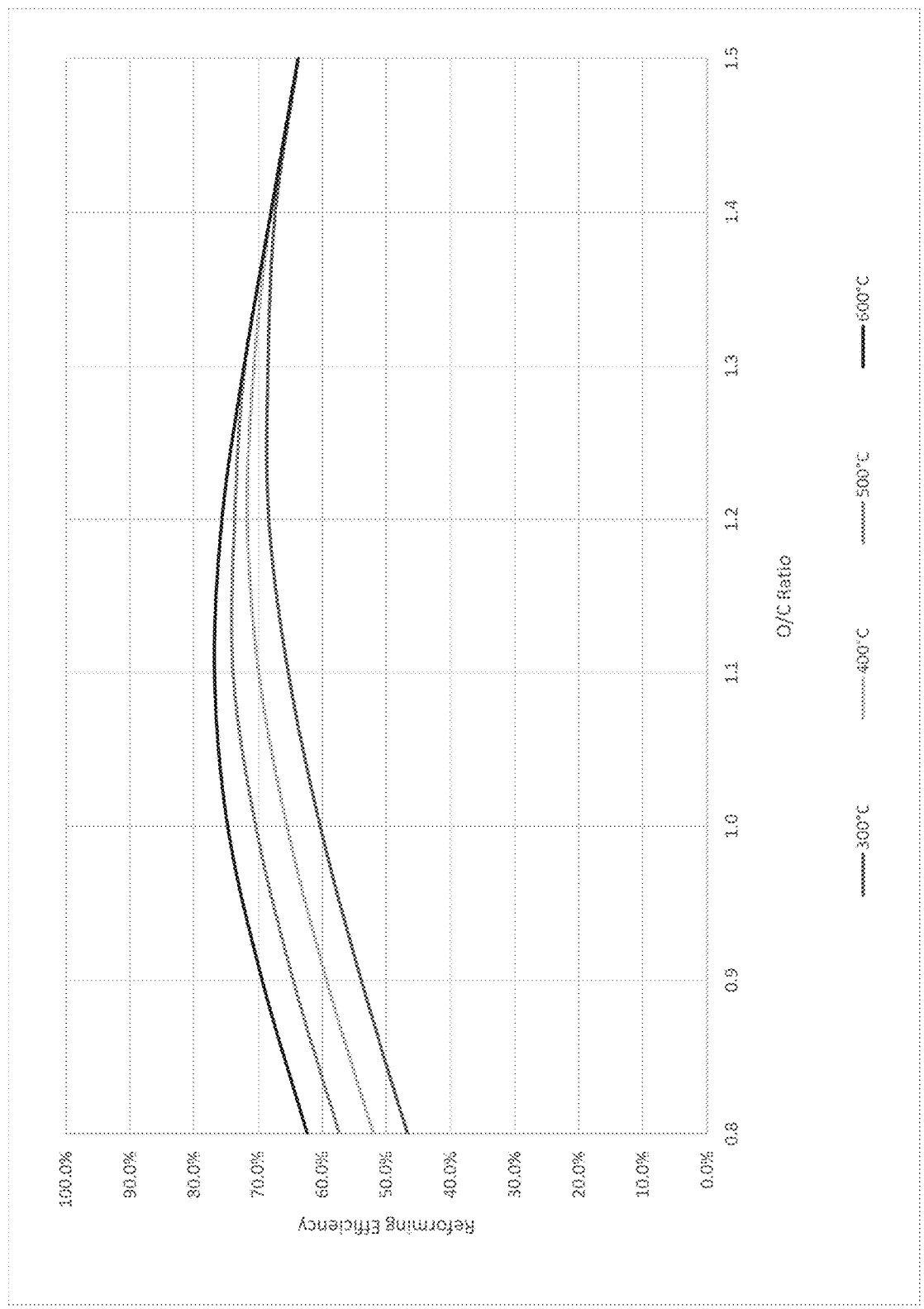
FIG. 20 is a graph showing the effect of O/C ratio on reforming efficiency at four different temperatures.
Figure 21:
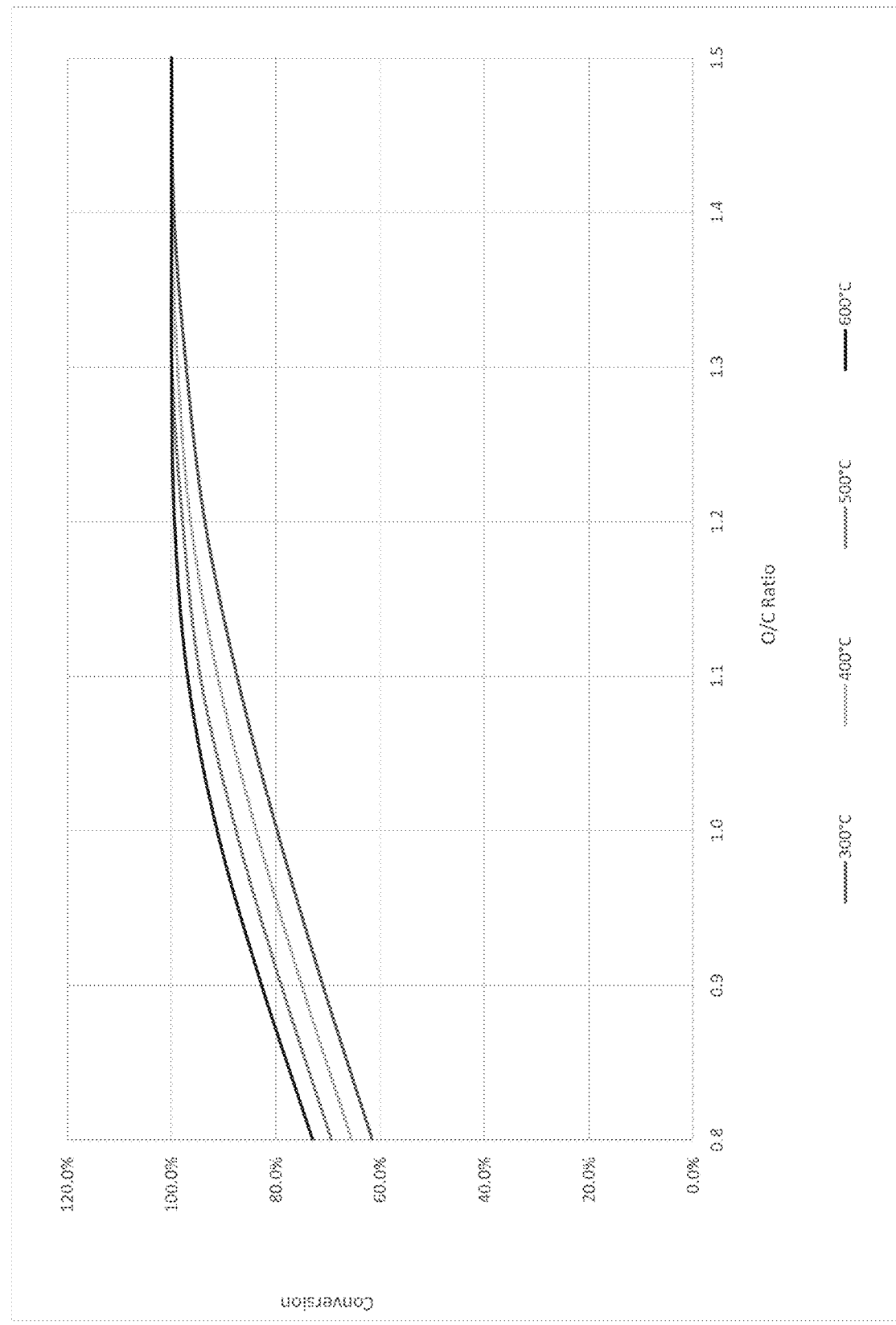
FIG. 21 is a graph showing the effect of O/C ratio on conversion at four different temperatures.

FIGS. 20 and 21 show the simulated effect of O/C ratio on reforming efficiency and conversion in a distributed reformer at T=300° C., 400° C., 500° C., and 600° C. As the temperature rose from 300° C. to 600° C., full conversion occurred at lower O/C ratios. Full conversion occurred at O/C ratios greater than 1.2. Peak efficiency was demonstrated near or at full conversion. Experimental reforming efficiency and conversion are expected to be higher than the model predictions, as numerical models over predicted acetylene formation and under predicted carbon monoxide formation. Reforming efficiency increased with inlet temperature and occurred at lower O/C ratios. The highest efficiency predicted was 76.8%, which is higher than previously demonstrated reforming efficiencies of 60-70% (using conventional non-catalytic reforming methods). Maximum efficiency and conversion may be higher and occur at slightly lower O/C ratios than predicted by simulation, due to the tendency to over predict acetylene and other lower hydrocarbons.

Figure 22:
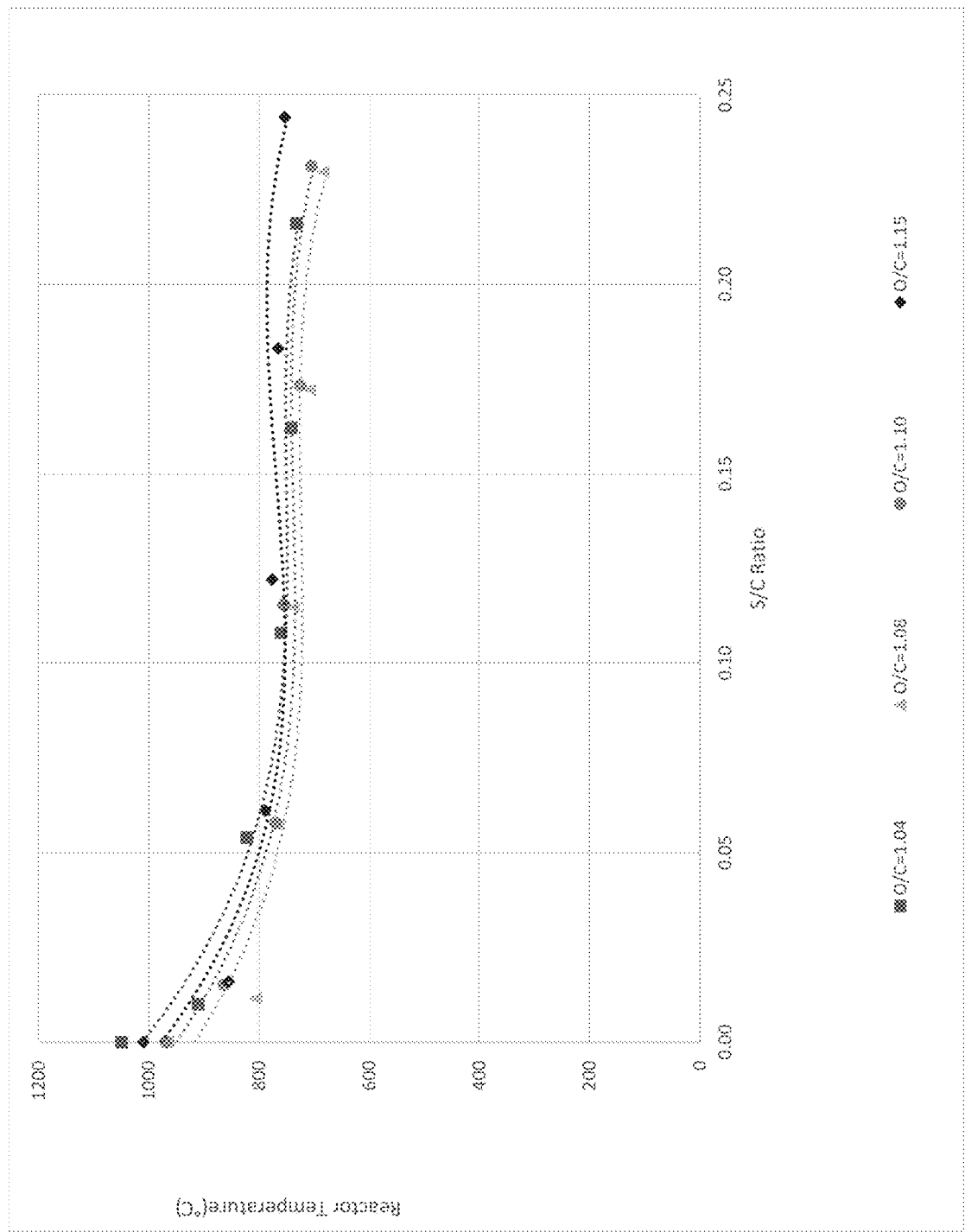
FIG. 22 shows the effect of S/C ratio on reactor temperature at four different O/C ratios.

FIG. 22 shows the effect of S/C ratio on reactor temperature at O/C=1.04, 1.08, 1.10, and 1.15. The addition of steam, even in trace amounts (S/C~0.01), decreased reactor temperature and promoted a more distributed reactor. Accordingly, the present method and system controls the reactor temperature at the following ranges: 900° C.-1200° C., or 800° C.-1200° C., or 700-1200° C. The present non-catalytic distributed reforming process has the potential to reform a wide range of high molecular weight hydrocarbon fuels with little potential for damage to the reactor. High molecular weight hydrocarbon fuels, including diesel fuels, are expected to produce syngas with a comparable product distribution. Although the higher poly-aromatic content of diesel may require higher temperatures, the higher reactor temperatures help mitigate tar formation, which can occur under gasification conditions.

In an alternative embodiment of the present method, the addition of catalysts yields superior results over non-catalytic embodiments of the present method and system. In the present disclosure, the distributed reaction regime's uniform thermal field and suppression of soot formation should enhance the durability of a catalyst. The well-mixed nature of the distributed reactor will suppress hot spots, preventing catalyst sintering. In another aspect of this embodiment, catalysts are incorporated in the reformation reaction that will promote the aforementioned steam reforming reaction conditions. The distributed reaction regime conditions in the present method and system were able to support a stable flame at lower temperatures (700-800° C.); however, the reactor was limited to low steam to carbon ratios. Non-catalytic steam reforming was highly active at temperatures ranging from 800 to 1200° C. Yet, catalysts may promote steam reforming reactions at lower temperatures ranging from 700 to 800° C. Nickel may be employed in the present reformation reaction due to its high activity and low cost. Although nickel has a tendency to promote soot formation reactions, the present method and systems suppresses soot formation. Accordingly, suitable catalysts include (but are not limited to) nickel, copper, palladium, platinum, rhodium, and transition metal carbides.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" or "in an embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processing device, a processor, or other electronic device can read. In one embodiment, the computer-readable medium is a non-transitory computer-readable storage medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

What is claimed is:

1. A method for controlling a fuel reformation reaction in a fuel reformation reactor, the method comprising:
   controlling a first amount of a fuel injected into the fuel reformation reactor;
   controlling a first amount of a steam that is injected into the fuel reformation reactor;
   controlling an amount of an oxygen that is injected into the fuel reformation reactor;
   controlling the temperature of the fuel reformation reactor;
   entraining an amount of heat, a second amount of the steam and an amount of a carbon dioxide into a mixture comprising a second amount of the fuel in the fuel reformation reactor; and
   igniting, in the fuel reformation reactor, a mixture created from the entraining that comprises the amount of heat, the second amount of the steam, the amount of the carbon dioxide, and the second amount of the fuel,
   wherein the fuel comprises a hydrocarbon fuel and
   wherein the fuel reformation reaction is a non-catalytic reaction.

2. The method according to claim 1, wherein a Damkohler number of the fuel reformation reaction ranges from 0.0001 to 0.1.

3. The method according to claim 1, further comprising controlling the first amount of the steam and the first amount of the fuel injected into the fuel reformation reactor so that a molar ratio of the first amount of the steam to carbon of the first amount of the fuel ranges from 0.1 to 2.0.

4. The method according to claim 1, further comprising controlling the amount of the oxygen and the fir s t amount of the fuel so that a molar ratio of the oxygen to carbon of the first amount of the fuel ranges from 0.8 to 1.4.

5. The method according to claim 1, further comprising controlling the temperature of the fuel reformation reactor to range from 700° C. to 1200° C.

6. The method according to claim 1, wherein the hydrocarbon fuel comprises a hydrocarbon fuel having a carbon number of at least 5.

7. The method according to claim 1, wherein the igniting the mixture created by the entraining is effectuated by a transparent flame.

8. The method according to claim 1, wherein a residence time of at least one of the first amount of the fuel, the first amount of the steam, and the first amount of the oxygen injected into the fuel reformation reactor ranges from 0.5 seconds to 1.5 seconds.

9. The method according to claim 1, wherein a reforming efficiency ranges from 67.74 percent to 85.6 percent.

10. The method according to claim 1, wherein a temperature of the fuel reformation reaction remains constant and where a pressure of the fuel reformation reaction remains constant.

\* \* \* \* \*